United States Patent
Ortiz et al.

(10) Patent No.: US 11,471,859 B2
(45) Date of Patent: Oct. 18, 2022

(54) TREATMENT AND REGENERATION SYSTEM AND METHOD FOR EXTRACTING ORGANIC SOLUTES FROM-WATER

(71) Applicant: ABS MATERIALS, INC., Wooster, OH (US)

(72) Inventors: Patricio A. Ortiz, Wooster, OH (US); Glenn C. Johnson, Wooster, OH (US); Paul L. Edmiston, Wooster, OH (US); Stephen Jolly, Wooster, OH (US)

(73) Assignee: ABS MATERIALS, INC., Wooster, OH (US)

( * ) Notice: Subject to any disclaimer, the term of this patent is extended or adjusted under 35 U.S.C. 154(b) by 150 days.

(21) Appl. No.: 16/318,737

(22) PCT Filed: Jul. 20, 2017

(86) PCT No.: PCT/US2017/043001
§ 371 (c)(1),
(2) Date: Jan. 18, 2019

(87) PCT Pub. No.: WO2018/017795
PCT Pub. Date: Jan. 25, 2018

(65) Prior Publication Data
US 2019/0283001 A1    Sep. 19, 2019

Related U.S. Application Data

(60) Provisional application No. 62/364,411, filed on Jul. 20, 2016.

(51) Int. Cl.
*B01J 20/34*    (2006.01)
*C02F 1/28*    (2006.01)
*C02F 101/32*    (2006.01)

(52) U.S. Cl.
CPC ....... *B01J 20/3408* (2013.01); *B01J 20/3416* (2013.01); *B01J 20/3425* (2013.01);
(Continued)

(58) Field of Classification Search
None
See application file for complete search history.

(56) References Cited

U.S. PATENT DOCUMENTS 2,566,613 A    9/1951  Hepp
4,147,624 A *  4/1979  Modell .............. B01D 11/0203
                                            210/673
(Continued)

FOREIGN PATENT DOCUMENTS

WO    2013019965    2/2013

OTHER PUBLICATIONS

Patent Cooperation Treaty (PCT), International Search Report and Written Opinion for Application PCT/US2017/043001 filed Jul. 20, 2017, dated Sep. 20, 2017, International Searching Authority, EP.

*Primary Examiner* — Akash K Varma
(74) *Attorney, Agent, or Firm* — McDonald Hopkins LLC

(57) ABSTRACT

Provided is a system and method for extracting organic solutes from water with a filter media. The system and method allow for regenerating the filter media following treatment of a water supply containing one or more organic solutes to allow the media to be reused for subsequent water treatment operations. The system and method also allows for regeneration of the displacement fluid for reuse in the regeneration of the media with recovery of at least one or more organic solutes from the displacement fluid. Additionally, the system and method allows for substantially continuous treatment of a water supply and regeneration of a filter media.

14 Claims, 7 Drawing Sheets

(52) U.S. Cl.
CPC ....... *B01J 20/3433* (2013.01); *B01J 20/3458* (2013.01); *B01J 20/3475* (2013.01); *C02F 1/285* (2013.01); *C02F 1/281* (2013.01); *C02F 1/288* (2013.01); *C02F 2101/32* (2013.01); *C02F 2303/16* (2013.01); *Y02C 20/40* (2020.08)

(56) References Cited

U.S. PATENT DOCUMENTS

| | | |
|---|---|---|
| 4,442,210 A | 4/1984 | Dessau et al. |
| 4,648,977 A | 3/1987 | Garg et al. |
| 4,935,400 A | 6/1990 | Blackburn et al. |
| 7,790,830 B2 | 9/2010 | Edmiston |
| 8,119,759 B2 | 2/2012 | Edmiston |
| 8,367,793 B2 | 2/2013 | Edmiston |
| 8,754,182 B2 | 6/2014 | Edmiston |
| 8,921,504 B2 | 12/2014 | Yang |
| 9,144,784 B2 | 9/2015 | Edmiston |
| 2007/0275144 A1 | 11/2007 | Wiesmuller |
| 2010/0113856 A1* | 5/2010 | Edmiston ............... C08G 77/48 588/249 |
| 2014/0135212 A1* | 5/2014 | Edmiston ............... B01J 20/103 502/402 |
| 2014/0221693 A1* | 8/2014 | Ramirez-Corredores ................... B01J 20/262 568/366 |
| 2019/0076820 A1* | 3/2019 | Ahn ................... B01D 53/0462 |

* cited by examiner

TREATMENT AND REGENERATION SYSTEM AND METHOD FOR EXTRACTING ORGANIC SOLUTES FROM-WATER

CROSS-REFERENCE TO RELATED APPLICATIONS

The present application claims priority to and the benefit of International Patent Application No. PCT/US2017/043001 filed Jul. 20, 2017, which claims priority to and benefit of U.S. Provisional Application No. 62/364,411 filed on Jul. 20, 2016, each of which are incorporated by reference herein in their entirety.

FIELD

The present invention relates to a system and method for removing organic solutes from water. In particular, the present invention relates to a system and method for treating water to remove organic solutes from the water or aqueous solution via a filter media and to regenerate and reuse the filter media. The system and method may also allow for the continuous processing of a contaminated water source.

BACKGROUND

Various types of filter media may be used to treat water from industrial applications, groundwater remediation applications, oil production and refining operations, etc., to remove organic solutes—from the water. One of the most widely used filters is a bed of granulated activated carbon media (GAC) for the treatment of industrial process water and/or wastewater. The contaminated water flows through the bed of activated carbon and the organic contaminants are adsorbed by the activated carbon bed. The contaminated water can be flowed through the activated carbon bed until the activated carbon becomes saturated with contaminants and it is no longer effective at removing contaminants from the water.

While being an effective material to filter and remove organic solutes from water, activated carbon is difficult to regenerate and reuse. Conventional regeneration techniques involve heating GAC to very high temperatures (T≈900° C.). This thermal process requires special handling equipment, storage silos, and an expensive kiln. On-site thermal processing is often not economically justifiable. One option to regenerate activated carbon is to transport tons of activated carbon to specialized carbon kiln facilities dedicated to the thermal regeneration process. In addition to the time and expense to transport the saturated activated carbon, the thermal process to regenerate the material has significant environmental and economic consequences. These consequences include the use of significant amounts of energy for kiln operation and the release of substantial amounts of $CO_2$ into the environment; adsorbates from the activated carbon are also released into the atmosphere in reactive, oxidized and partially-oxidized states; release of heated activated carbon releases particulate matter and other pollutants into the atmosphere; and loss of activated carbon through oxidation and through mechanical degradation to unusably-small GAC particles.

An alternative to thermal processing is to discard the saturated activated carbon. This adds cost to the treatment process to not only discard the activated carbon but to replace the spent material with fresh material to treat the water.

Other granulated filter material may be used to capture organic solutes from a water source. Attempts to regenerate filter media have included backwashing or back flushing the media with a solvent to remove the adsorbed chemical species from the filter media. Backwashing is accomplished by pumping a solvent, such as water, acid, or alkali, back through the granular filter media via the collector/distributor pipe (i.e., the pipe used in its distributor mode). The backwashing solvent is dependent on the type of granular filter media being utilized and the nature of the fluid and chemical specie being filtered. That is, a solvent is selected based on its affinity for the chemicals adsorbed to the filter media. While perhaps being able to remove chemical species from the filter media and regenerate the filter media for further use to treat a contaminated water source or an industrial process water, backwashing still generates substantial amounts of waste that must be handled or disposed of Handling, treatment, and/or disposal of the backwashing fluid containing the chemical species can be expensive.

These conventional methods for treating water containing one or more organic solutes and attempting to regenerate the filter media provides a number of challenges. Given the difficulty in regenerating some filter media types such as activated carbon, a significant number of processing units are required to achieve a large throughput of water. Specifically, several units must be available to accommodate taking a treatment unit off line once it becomes saturated and to account for the fact that the saturated unit is likely unusable and must be discarded. The conventional systems will also require expensive equipment and require significant energy resources and expense to treat and regenerate the filter media.

Thus, there is still a need for a system to treat water containing one or more organic solutes that allows for treating water, regenerating the filter media, and optionally recovering the regenerating material and even the organic solutes removed from the water.

SUMMARY

The present invention provides a system and method for treating water containing one or more organic solutes. The system and method provides a way for (i) treating a water source with a filter media to remove organic solutes (e.g., organic contaminants) from the water, and (ii) regenerating the filter media to further treat the water.

In one aspect, the invention provides a system and method for (i) treating a water source with a filter media to remove organic solutes from the water, (ii) regenerating the filter media by treating the saturated or partially saturated filter media with a displacement fluid, and (iii) capturing the organic solutes from the displacement fluid. This system and method provide for separation of the organic solutes from the displacement fluid, which allows the organic solutes to be recycled and reused. Additionally, the system and method may allow for recapture and reuse of the displacement fluid for subsequent regeneration operations on a saturated or partially saturated filter media.

In another aspect, the present invention provides a system and method for substantially continuous process of a water source. By the present methods and systems, a system may be provided that allows for substantially continuous treatment of a water source containing one or more organic solutes with a filter media and regeneration of the filter media.

In one aspect, provided is a method of regenerating a filter media comprising: providing a filter media comprising one or more organic solutes adsorbed thereto; and treating the filter media with a displacement fluid, wherein the displacement fluid extracts at least one or more organic solutes from the filter media to provide a waste displacement fluid.

In one embodiment of the method of regenerating a filter media, the displacement fluid is a liquid.

In one embodiment of the method of regenerating a filter media, wherein the displacement fluid is a gas.

In one embodiment, the method of regenerating a filter media according to any previous embodiment comprises treating the waste displacement fluid to separate the at least one or more organic solutes from the waste displacement fluid.

In one embodiment of the method of regenerating a filter media according to any previous embodiment, the displacement fluid is a liquid and treating the waste displacement fluid comprises subjecting the waste displacement fluid to (i) a temperature, (ii) a pressure, or (iii) both (i) and (ii) to obtain a recycled displacement fluid by causing the displacement fluid to vaporize and at least one or more organic solutes to remain in a liquid state or to drop out as a solid.

In one embodiment of the method of regenerating a filter media according to any previous embodiment, the displacement fluid is a gas, and treating the waste displacement fluid comprises subjecting the waste displacement fluid to (i) a temperature, (ii) a pressure, or (iii) both (i) and (ii) to obtain a recycled displacement fluid by causing at least one or more organic solutes to drop out of the waste displacement fluid as a liquid or a solid.

In one embodiment, the method includes using the recycled displacement fluid in the step of treating the filter media.

In one embodiment of the method of regenerating a filter media according to any previous embodiment, at least one or more organic solutes separated from the displacement fluid are collected for disposal, reuse, or recovery.

In one embodiment of the method of regenerating a filter media according to any previous embodiment, the filter media is chosen from organosilica particles, porous polymeric beads, silica particles, functionalized sand, activated alumina, activated carbon or charcoal, a zeolite, a molecular sieve, a silica gel, a metal oxide or mixed metal oxide, an organophilic polymeric sorbent, an ion exchange resin, a silica alumina, or a combination of two or more thereof.

In one embodiment of the method of regenerating a filter media according to any previous embodiment, the displacement fluid is chosen from a saturated fluorocarbon, an unsaturated fluorocarbon, a chlorofluorocarbon, a hydrochlorofluorocarbon, a fluoroether, a hydrocarbon, carbon dioxide, nitrogen, argon, dimethyl ether, ammonia, iodotrifluoromethane, or a combination of two or more thereof.

In one embodiment of the method of regenerating a filter media according to any previous embodiment, treating the filter media with a displacement fluid comprises (i) treating the filter media with a first displacement fluid to remove a first set of one or more organic solutes from the filter media; and (ii) treating the filter media with a second displacement fluid to remove a second set of one or more organic solutes from the filter media. In one embodiment, treating with the first displacement fluid (i) and treating with the second displacement fluid are performed in separate, successive steps. In one embodiment, the method comprises purging the filter media following the treatment with the first displacement fluid and prior to the treatment with the second displacement fluid.

In one aspect, provided is a system for removing an organic solute from a water supply or aqueous solution with a filter media and regenerating a filter media comprising: (i) a filter media housing for a filter media for removing organic solutes from a water supply and producing a treated water supply, the filter media housing comprising an inlet for receiving a fluid and an outlet for the fluid to exit the filter media housing; (ii) a displacement fluid source for a displacement fluid suitable for extracting organic solutes adsorbed by a filter media within the filter media housing, the displacement fluid source in communication with the inlet of the filter media housing; (iii) (a) a pump to supply a gaseous displacement fluid from the displacement fluid source into the filter media housing; or (b) a compressor to compress a gaseous displacement fluid from the displacement fluid source into a liquid displacement fluid for supplying to the inlet of the filter media housing; (iv) an expansion valve in communication with the outlet of the filter media housing to create a high pressure zone and a low pressure zone for recovery of the gaseous displacement fluid while compressing the extracted organic solutes to liquid or solid form to provide a gaseous recycled displacement fluid and solution comprising the extracted organic solutes; and (v) a collector for receiving the gaseous recycled displacement fluid and collecting the extracted organic solutes that are not vaporized with the displacement fluid.

In one embodiment, the system comprises a vessel for storing the gaseous recycled displacement fluid.

In one embodiment of the system according to any previous embodiment, the system comprises a compressor to draw the vaporized displacement fluid out of the contaminants collector and convert the gaseous recycled displacement fluid to a liquid recycled displacement fluid.

In one embodiment of the system according to any previous embodiment, comprising a vessel for storing the liquid recycled displacement fluid.

In one embodiment of the system according to any previous embodiment, the compressor and/or the vessel for storing the recycled liquid displacement fluid is in fluid communication with a conduit for supplying displacement fluid to the filter media housing.

In one embodiment of the system according to any previous embodiment, the system comprises a valve for controlling the flow of the water supply containing one or more organic solutes to the filter media housing, and a valve for controlling the flow of the displacement fluid to the filter media housing.

In one embodiment of the system according to any previous embodiment, the system comprises an inert gas source in fluid communication with the filter media housing for flowing an inert gas through the filter media housing.

In one aspect, provided is a method for the extraction of an organic solute from an aqueous solution comprising: (i) treating an aqueous solution containing one or more organic solutes by passing the aqueous solution through a filter media vessel comprising a filter media to remove at least one of the one or more organic solutes from the aqueous solution and providing a treated water supply; (ii) regenerating the filter media after the filter media becomes saturated or partially saturated with organic solutes by supplying a displacement fluid to the saturated filter media to remove at least one of the one or more organic solutes from the filter media and provide a waste displacement fluid comprising the displacement fluid and at least one or more organic solutes; and (iii) repeating steps (i) and (ii) one or more times to continue to treat the aqueous solution.

In one embodiment, the method for the extraction of an organic solute from an aqueous solution comprises treating the waste displacement fluid to separate the displacement fluid from at least one of the one or more organic solutes.

In one embodiment of the method for the extraction of an organic solute from an aqueous solution according to any previous embodiment, the displacement fluid is a liquid and treating the waste displacement fluid comprises subjecting the waste displacement fluid to conditions that vaporize the displacement fluid to provide a regenerated displacement fluid, but are such that at least one of the one or more organic solutes remain in a liquid or solid state.

In one embodiment of the method for the extraction of an organic solute from an aqueous solution according to any previous embodiment, the displacement fluid is a gas and treating the waste displacement fluid comprises subjecting the waste displacement fluid to conditions that compress the extracted organic solutes to a liquid or solid state to provide a regenerated displacement fluid and a solution comprising the extracted organic solutes.

In one embodiment of the method for the extraction of an organic solute from an aqueous solution according to any previous embodiment, the regenerated displacement fluid is converted to a liquid and recycled to the regenerating step.

In one embodiment of the method for the extraction of an organic solute from an aqueous solution according to any previous embodiment, the regenerated displacement fluid is collected and employed in a subsequent regeneration step.

In one embodiment of the method for the extraction of an organic solute from an aqueous solution according to any previous embodiment, regenerating the filter media by supplying a displacement fluid to the saturated filter media comprises (a) supplying a first displacement fluid to remove a first set of one or more organic solutes from the filter media; and (b) supplying a second displacement fluid to remove a second set of one or more organic solutes from the filter media.

In one embodiment of the method for the extraction of an organic solute from an aqueous solution according to any previous embodiment, supplying the first displacement fluid and supplying the second displacement fluid are performed in separate, successive steps.

In one embodiment of the method for the extraction of an organic solute from an aqueous solution according to any previous embodiment, the method comprises purging the filter media following the treatment with the first displacement fluid and prior to the treatment with the second displacement fluid.

In one aspect, provided is a method for the extraction of an organic solute from an aqueous solution comprising: (i) supplying a water supply containing one or more organic solutes to a first filter media for extracting organic solutes from the water supply containing one or more organic solutes until the first filter media becomes saturated or partially saturated; (ii) upon the first filter media becoming saturated or partially saturated: (a) stopping the flow of the water supply containing one or more organic solutes to the first filter media and switching the flow of the water supply containing one or more organic solutes to a second filter media for extracting organic solutes from the water supply; and (b) regenerating the first filter media by supplying a gaseous or liquid displacement fluid to the first filter media to extract organic solutes from the filter media; (iii) treating the water supply containing one or more organic solutes with the second filter media until the second filter media becomes saturated or partially saturated; (iv) upon the second filter media becoming saturated or partially saturated: (a) stopping the flow of the water supply containing one or more organic solutes to the second filter media and switching the flow of the water supply containing one or more organic solutes back to the first filter media to extract organic solutes from the water supply; and (b) regenerating the second media filter by supplying a gaseous or liquid displacement fluid to the first filter media to extract organic solutes from the filter media; and (c) switching the flow of the water supply containing one or more organic solutes to the first filter media after regeneration of the first filter media is completed and treating the water supply containing one or more organic solutes with the first filter media until the first filter media becomes saturated. In one embedment, the method comprises repeating steps (ii)-(iv).

In aspect, provided is a system for treating a water supply containing one or more organic solutes comprising: a first filter media housing having an inlet and an outlet, the inlet of the first filter media housing being in communication with a water supply containing one or more organic solutes; a second filter media housing having an inlet and an outlet, the inlet of the second filter media housing being in communication with a water supply containing one or more organic solutes; a displacement fluid vessel for a displacement fluid to extract one or more organic solutes from and regenerate the first filter media and the second filter media, the displacement fluid vessel in fluid communication with the inlet of the first filter media housing and the inlet of the second filter media housing; a first valve to control the flow of the water supply containing one or more organic solutes to the first filter media housing; a second valve to control the flow of the water supply containing one or more organic solutes to the second filter media housing; a third valve to control the flow of the displacement fluid to the first filter media housing; a fourth valve to control the flow of the displacement fluid to the second filter media housing.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
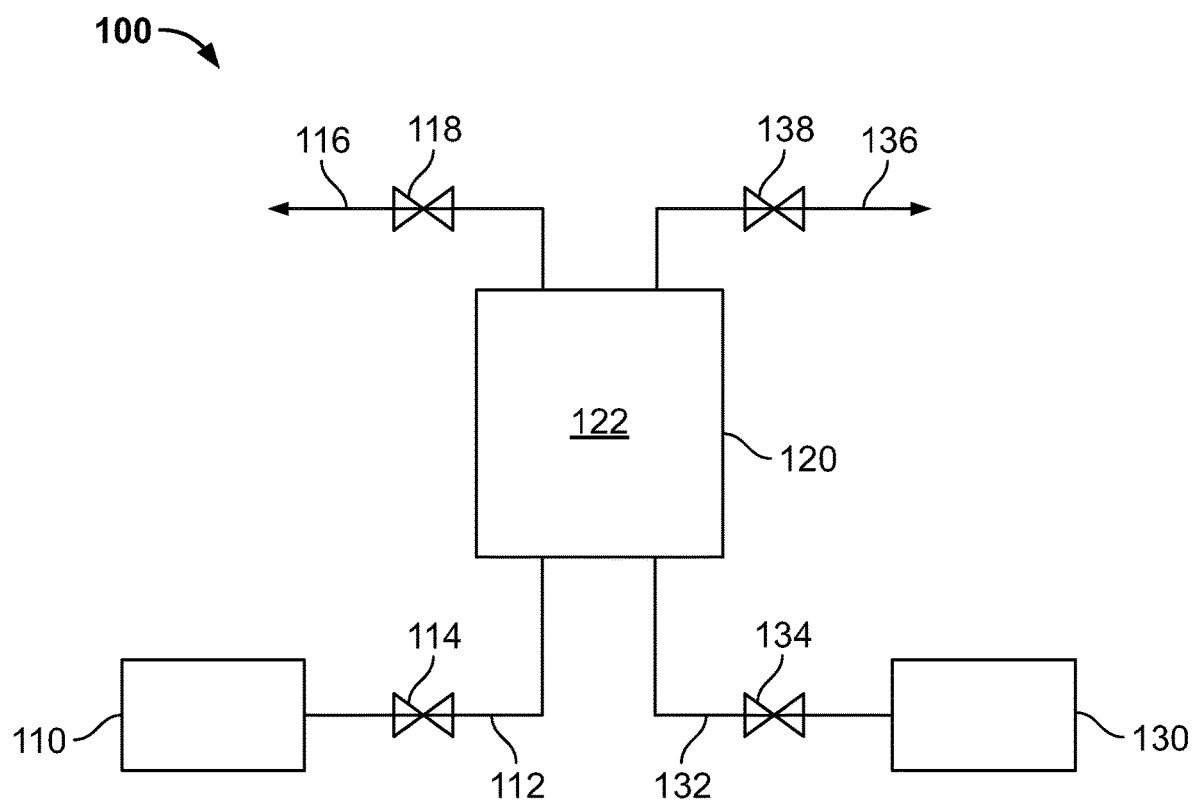
FIG. 1 is a schematic illustration of an embodiment of a system for treating water with a filter media and for regenerating the filter media.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, the term "water" is defined as any water, aqueous solution, waste water, process water, industrial water, groundwater, stormwater, produced water, or water containing organic solutes. As used herein, the term "organic solutes" is defined as any combination of one or more dissolved or suspended organic molecules or compounds with partition coefficients greater than 0.1. "Organic solutes" are not particularly limited and includes those that are valuable raw materials, products, organic contaminants, by-products, or waste products to be recovered; unwanted raw materials, products, organic contaminants, by-products, or waste products to be disposed of; or organic extracts.

Various embodiments described herein relate to a system and method for treating water comprising organic solutes to remove one or more of the organic solutes therefrom. The system and method allow for (i) treating water with a filter media to remove or extract one or more organic solutes from the water, and (ii) regenerating the filter media by treating the filter media with a displacement fluid to remove the organic solutes absorbed by the filter media and allow the filter media to be reused for subsequent treatment of a water source. The system can be configured to allow for treating the displacement fluid comprising the organic solutes to separate the organic solutes from the displacement fluid and recapture the displacement fluid. In this manner, the organic solutes can be captured and disposed of or recycled, and the recaptured displacement fluid can be recycled or reused in the system in subsequent processing steps to regenerate the filter media.

The filter media may be regenerated at any selected level of saturation. The saturation level refers to the amount of organic solutes adsorbed by the filter media. A filter media is fully saturated when it cannot further adsorb any organic solutes. In embodiments, it is desirable to allow the filter media to become substantially saturated before subjecting the filter media to regeneration operations. However, regeneration of the filter media can be performed at any lesser (i.e., any partial) saturation level. Thus, as used herein, the term saturated refers to and encompasses a filter media that is partially saturated or fully saturated.

FIG. 1 is a schematic illustration of one embodiment of a system in accordance with aspects and embodiments of the disclosure. The system 100 comprises a filter media vessel (or housing) 120 comprising a filter media 122. As used herein, the terms "vessel" and "housing" are used interchangeably. The vessel 120 is in communication with a water source 110, which comprises water comprising one or more organic solutes that are to be removed therefrom. The filter media 122 is suitable for removing one or more of the organic solutes from the water source. The water source 110 is in communication with vessel 120 via a conduit 112. The water is passed through the conduit 112 and through the vessel 120, and the filter media acts to adsorb one or more types of organic solutes in the water source. The filtered water flows out of the vessel 120 via conduit 116 to a desired outlet (e.g., a vessel, stream, lake, etc.).

The system 100 is also configured for treating the filter media 122 to remove organic solutes that are adsorbed to the filter media through the processing of the water source. The vessel 120 is also in communication with a displacement fluid source 130 that comprises a displacement fluid material that is suitable for displacing the adsorbed organic solutes from the filter media 122 and facilitating the regeneration of the filter media 122. The displacement fluid source 130 is in communication with the filter media vessel 120 via a conduit 132. The system is also configured to control the flow of water or displacement fluid through the filter media vessel. The system may comprise any number of valves that may be opened or shut to control the flow of the respective materials to the filter media vessel. For example, system 100 is shown as including a valve 114 to control the flow of water through conduit 112, and valve 134 to control the flow of the displacement fluid through conduit 132. Additionally, valves 118 and 136 are used to control the flow of the fluids exiting vessel 120. When water is being treated, valve 118 is opened to allow for the treated water to be sent to a suitable source. When the system is being operated to regenerate the filter media, valve 138 is opened and valve 118 is closed such that the displacement fluid containing the organic solutes is not passed to a clean water source through conduit 116, but rather is supplied to an appropriate outlet through conduit 136.

In operation, the system is configured to supply water from the water source 110 to the filter media vessel 120 and out to a recovery outlet through conduit 116. The flow of water is continued until the filter media 122 in the filter media vessel 120 becomes saturated or partially saturated and no longer effectively removes organic solutes from the water. At that point the valve 114 is closed, and the system can be operated to regenerate the filter media and remove the adsorbed organic solutes from the filter media. Prior to treating the saturated or partially saturated filter media with the displacement fluid, the vessel 120 may be purged with air, nitrogen, or other suitable gas to remove any water from the vessel 120. The valve 134 may be opened and the displacement fluid can be supplied to the vessel 120 to remove the organic solutes from the filter media. The point at which regeneration of the filter media is implemented may be selected as desired for a particular purpose or intended application. That is, it is within the purview of those operating the system to select when the filter media is to be regenerated.

It will be appreciated that the system can include any control boxes, electronics, pumps, etc. to operate and control the opening and closing of the respective valves or pumps that may be employed to facilitate and control the flow of the respective fluids through the system.

Also provided is a method and system for regenerating a filter media and collecting the organic solute removed in the regeneration step and/or recycling the displacement fluid employed in the regeneration operation. In embodiments, provided is a method for (i) treating a source of water to remove organic solutes from the water by passing the water through a filter media; (ii) stopping the flow of the water supply to the filter media upon the filter media becoming saturated or partially saturated with organic solutes; (iii) regenerating the filter media by treating the filter media with a displacement fluid to remove the organic solutes from the filter media; (iv) treating the displacement fluid containing the organic solutes to separate the organic solutes from the displacement fluid and obtain a recycled displacement fluid. The method may further comprise (v) recycling the recycled displacement fluid to step (iii) of the method.

In the operation of regenerating the filter media, the displacement fluid may be provided in any suitable form to facilitate displacement and removal of the organic solutes from the filter media. In one embodiment, the displacement fluid is provided as a liquid. When the displacement fluid is a liquid, the displacement fluid may be chosen such that at least one of the organic solutes is soluble in the displacement fluid such that the organic solute will be desorbed from the filter media and taken up by the displacement fluid. In another embodiment, the displacement fluid is provided in a gaseous state. When a gaseous displacement fluid is employed to treat and regenerate the filter media, the gaseous displacement fluid will be heated to a temperature sufficient for one or more of the organic solutes adsorbed on the filter media to change to a gaseous state and be taken up by the filter media. It will be appreciated that the pressure of the system may be adjusted or controlled to facilitate the phase change of the organic solute(s) from the solid to the gaseous state.

Following treatment of the filter media with the displacement fluid, a displacement fluid is obtained that contains one or more of the organic solutes. The displacement fluid containing the one or more organic solutes may be subsequently treated to separate the one or more organic solutes from the displacement fluid. This can be accomplished in any suitable manner. In one embodiment, when a liquid displacement fluid is employed to regenerate the filter media, the displacement fluid can be separated from the organic solutes by vaporizing the displacement fluid into a gaseous state and causing the one or more organic solutes to drop out in a liquid or solid form. In another embodiment, when a gaseous displacement fluid is employed to regenerate the filter media, the displacement fluid containing the organic solutes can be subjected to temperatures and/or pressures sufficient to condense the organic solutes such that the organic solutes drop out as a solid or a liquid.

Upon separating the organic solutes from the displacement fluid, the displacement fluid may be recovered. The recovered displacement fluid may be recycled back to the system for use in subsequent filter media regeneration operations. The organic solutes may also be collected for disposal, reuse, or recovery.

Figure 2:
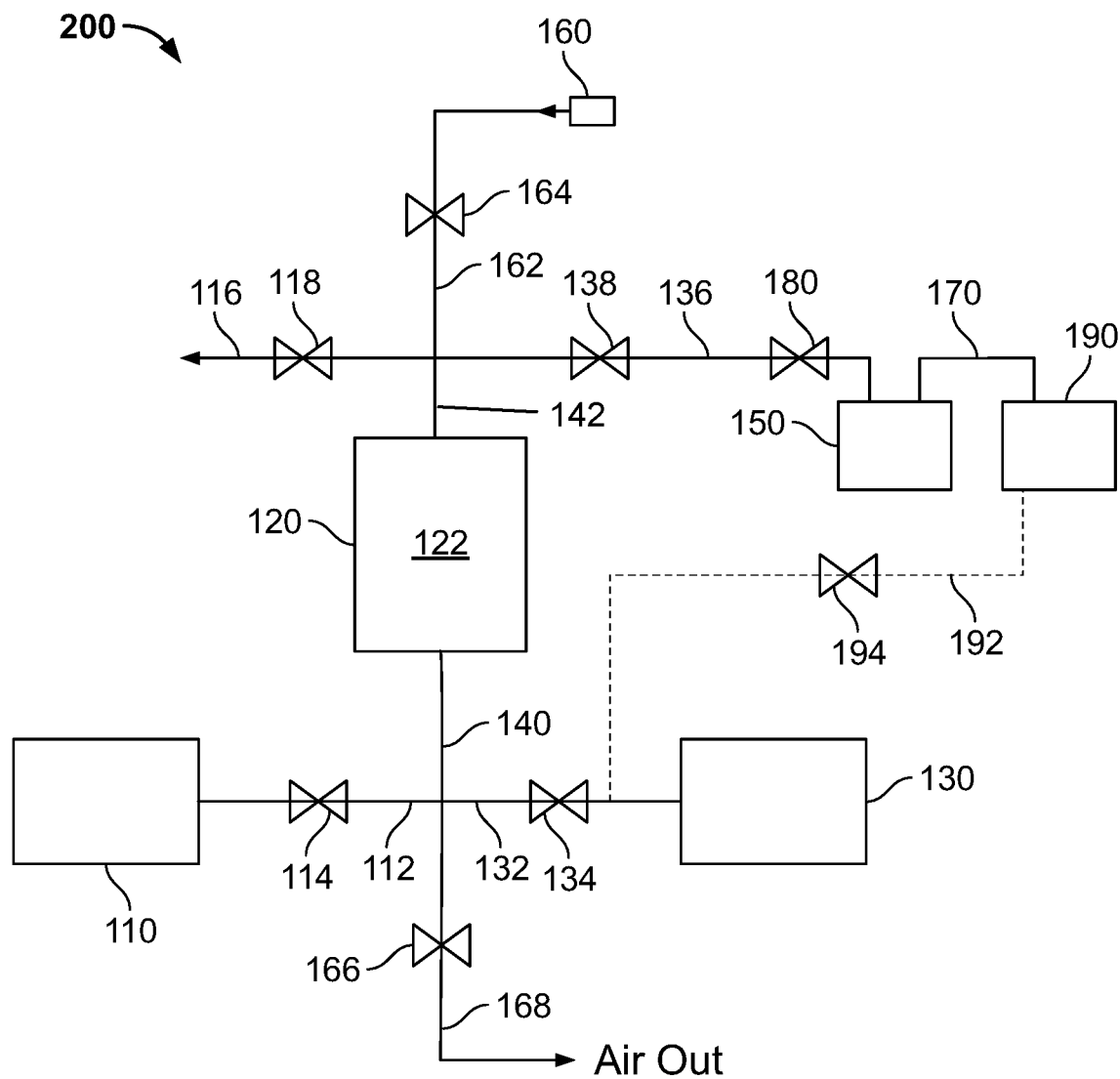
FIG. 2 is a schematic illustration of another embodiment of a system for treating water with a filter media and for regenerating the filter media.
Figure 3:
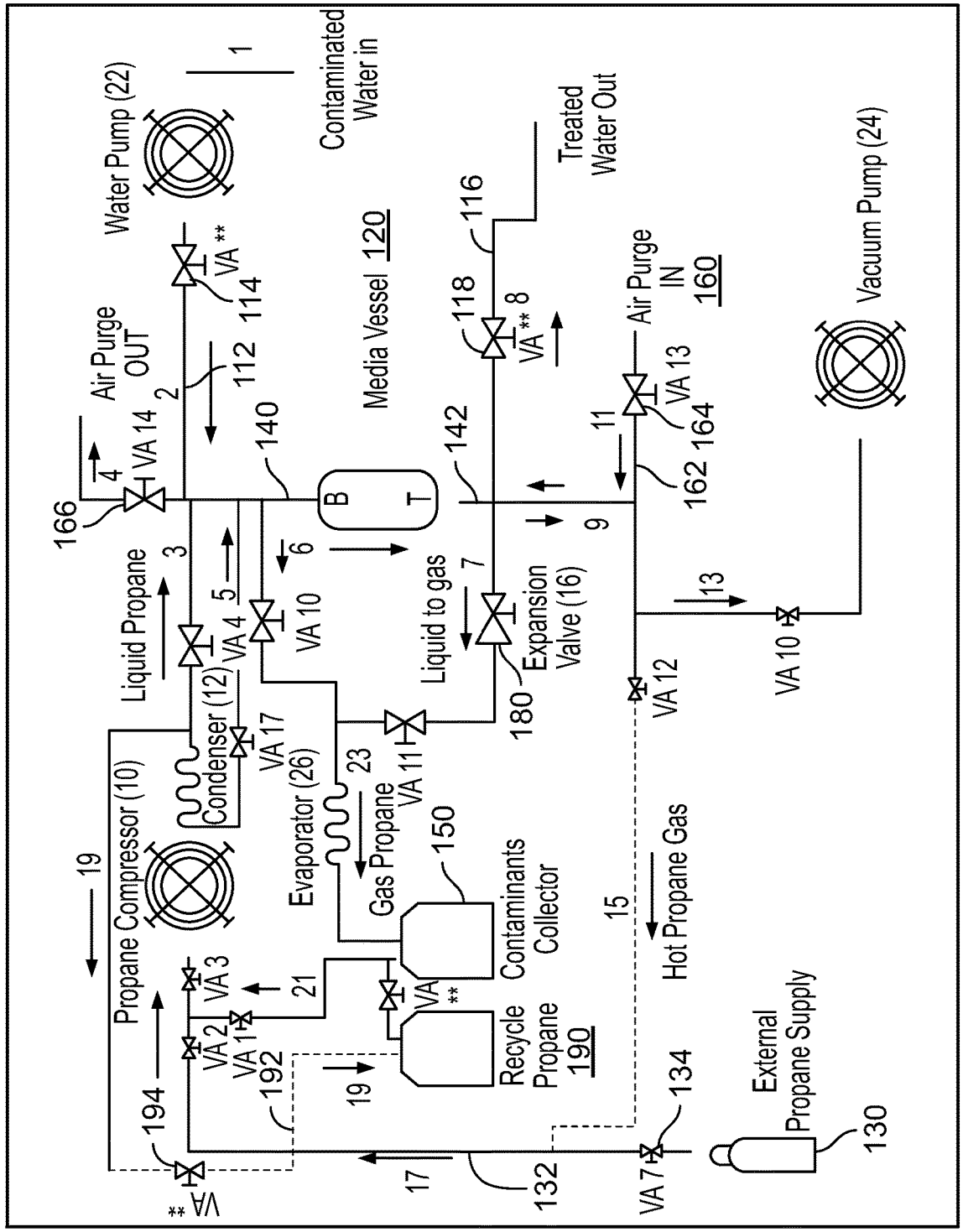
FIG. 3 is a process diagram of the embodiment of FIG. 2.

FIGS. 2 and 3 illustrate an exemplary embodiment of a system in accordance with aspects and embodiments of the disclosed technology to recycle the displacement fluid and/or collect organic solutes removed from the filter media following treatment of water with the filter media. System 200 illustrates a system for treating water. System 200 includes various components described with respect to FIG. 1. System 200 is shown with some additional features and a slightly different configuration. In system 200, the water is supplied from a water source 110 to vessel 120 containing the filter media 122 via conduit 112 that feeds into conduit 140. The treated water flows out of the vessel 120 through conduit 142 and into conduit 116 to an appropriate outlet for the treated water.

Upon the filter media becoming saturated with contaminants, the flow of water is shut off by closing the valve 114. Any water remaining in the vessel 120 and the conduits 140 and 142 may be removed by purging the system with a gas supplied from a gas source 160 via line 162 through line 142, vessel 120, line 140, and out through line 166. The flow of the gas can be controlled by valves 164 and 168.

After the system is purged to remove any water from the vessel and associated conduits, the regeneration process can be started by supplying the displacement fluid from the displacement fluid source 130 to the vessel 120. In system 200, the portion of the system configured to supply the displacement fluid is configured to supply the displacement fluid to the vessel in a liquid form. In accordance with an embodiment of the technology, the displacement fluid may be initially provided in a gaseous state and compressed and condensed into a liquid state to be supplied to and passed through the vessel 120. Thus, the system may comprise any components or equipment, e.g., compressors, condensers, etc. (not shown), to facilitate changing the displacement fluid from a gas to a liquid.

The displacement fluid containing the organic solutes that are displaced from the filter media flows through conduit 142 to conduit 136 through an expansion valve 180 and into expansion chamber 150. The expansion valve splits the system into a high pressure and a low pressure zone. In the expansion chamber, the low pressure zone causes the displacement fluid carrying the organic solutes to vaporize, and the organic solutes will remain liquid, or drop out as a solid. The gaseous, recycled displacement fluid may be passed through conduit 170 to a recycled displacement fluid collection vessel 190.

The gaseous displacement fluid is withdrawn from the expansion chamber 150. At this stage, the gaseous displacement fluid can be treated in any suitable manner. The gaseous displacement fluid may be collected and further treated to remove any organic solutes that have a boiling point below that of the displacement fluid. The gaseous displacement fluid may optionally be collected and recycled in another application. In still another alternative, the gaseous displacement fluid may be reused in the system 200. As illustrated in FIG. 2, the system 200 the gaseous, recycled displacement fluid may be passed from the collection chamber 190 through a conduit 192 that is in communication with conduit 132 to supply the recycled displacement fluid back to the system for regenerating the filter media. It will be appreciated that the recycled displacement fluid may be supplied to any suitable point in the process as desired or may be suitable for a particular application. For example, it may be possible to supply the recycled displacement fluid to a tank containing a fresh supply of the displacement fluid. This portion of the system may include a condenser and any other necessary equipment to convert the gaseous displacement fluid to the liquid state to use in the filter media regeneration operation.

Following regeneration of the filter media, the flow of displacement fluid to the vessel 120 is stopped by closing valve 134. After the regeneration operation is completed, the filter media vessel can be flushed of any liquid displacement fluid that remains in the vessel or can be purged by passing a heated gas through the system to vaporize the excess or remaining liquid displacement fluid. The gas is desirably heated to a temperature above the boiling point of the displacement fluid. The gas can be a gaseous form of the displacement fluid or it may be a different (inert) gas.

Upon completion of the regeneration process, the filter media 122 can be used to treat an additional supply of water. The valve 114 can be opened and a supply of water from source 110 can be flowed into the vessel 120 to treat the water with the filter media 122.

These operations can be repeated as necessary to treat a desired amount of water or until the filter media is no longer useful to remove organic solutes from the water.

The system 200 may include any control systems, electronics, monitors, programs, etc. to control the operation of the respective components. For example, the system may be controlled to open and close the respective valves during the appropriate stage of processing.

The system 200 thus provides for a method that includes: (i) treating a source of water to remove organic solutes from the water by passing the water through a filter media; (ii) stopping the flow of the water supply to the filter media upon the filter media becoming saturated or partially saturated; (iii) regenerating the filter media by treating the filter media with a displacement fluid to remove the organic solutes from the filter media; (iv) treating the displacement fluid containing the organic solutes to convert the displacement fluid from a liquid to a gaseous state so as to separate the displacement fluid from the organic solutes and obtain a recycled displacement fluid. Additionally, the system 200 also allows for (v) recycling the recycled displacement fluid to step (iii) of the method. The system 200 further provides for (vi) treating additional quantities of water using the regenerated filter media obtained following step (iii).

Figure 2A:
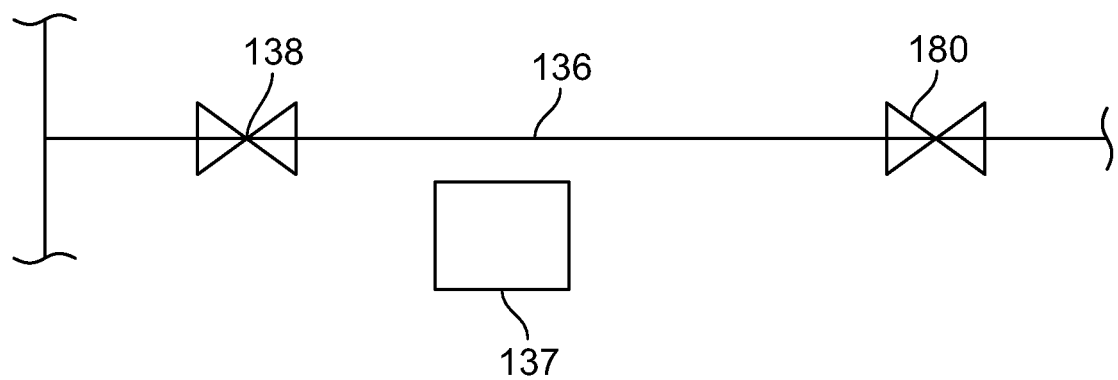
FIG. 2a is a schematic illustration showing a section of a variant of the system of FIG. 2.

The system 200 shown in FIGS. 2-3 is described with respect to employing a liquid displacement fluid in the regeneration operation. It will be appreciated that the system can be appropriately configured or altered when a gaseous displacement fluid is employed. In particular, it will be appreciated that an appropriate apparatus, e.g., a heat exchanger, may be included to facilitate the condensing of the organic solutes to cause the organic solutes to drop out of the gaseous displacement fluid as a liquid or a solid. For example, FIG. 2a illustrates a variation of a section of the system in FIG. 2 for a system employing a gaseous displacement fluid to displace the organic solutes from the filter media. FIG. 2a shows a heat exchanger 137 in the vicinity of conduit 136 to facilitate the condensing of the organic solutes.

Figure 4:
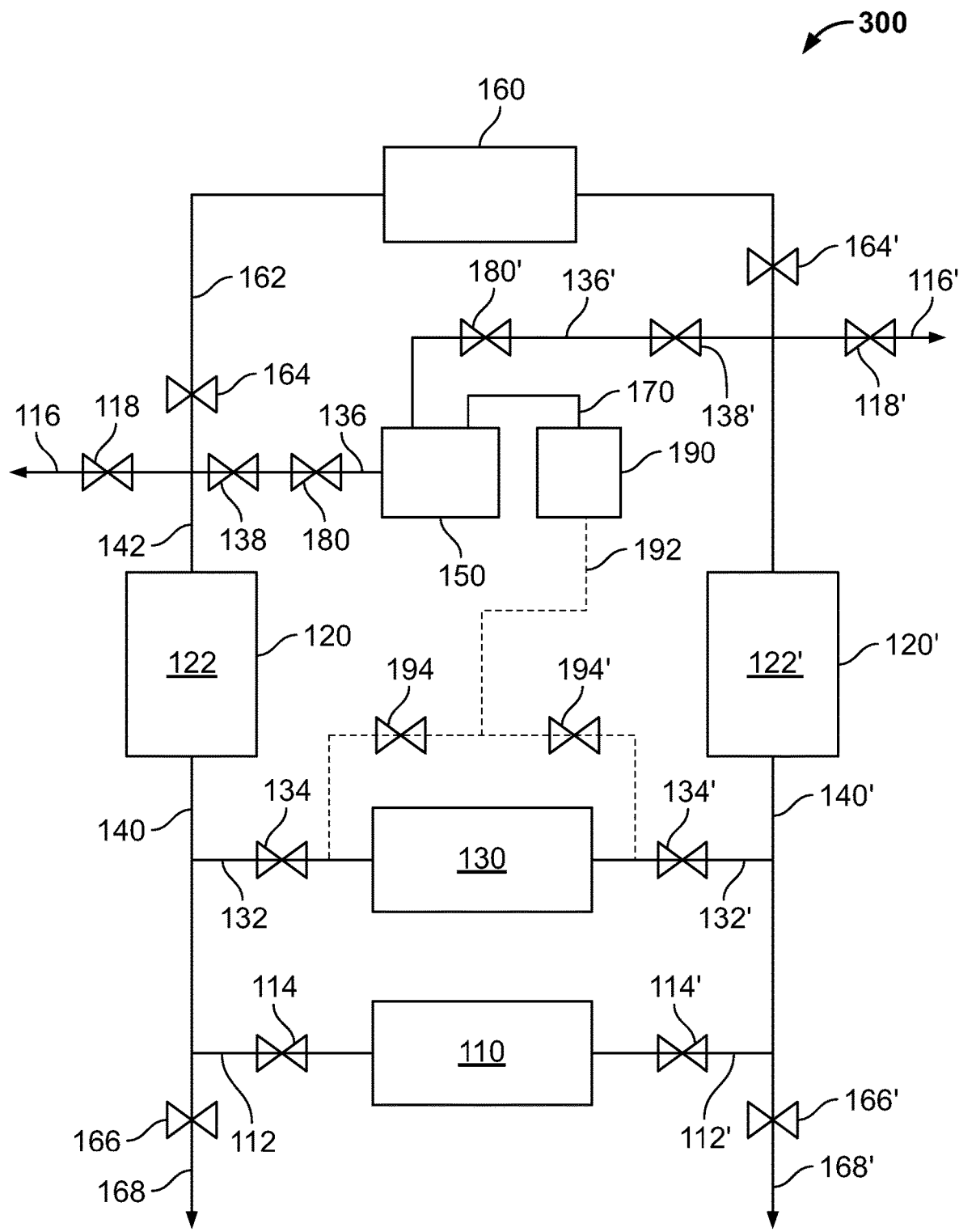
FIG. 4 is a schematic illustration of a system for continuously treating water with a filter media and for regenerating the filter media.
Figure 5:
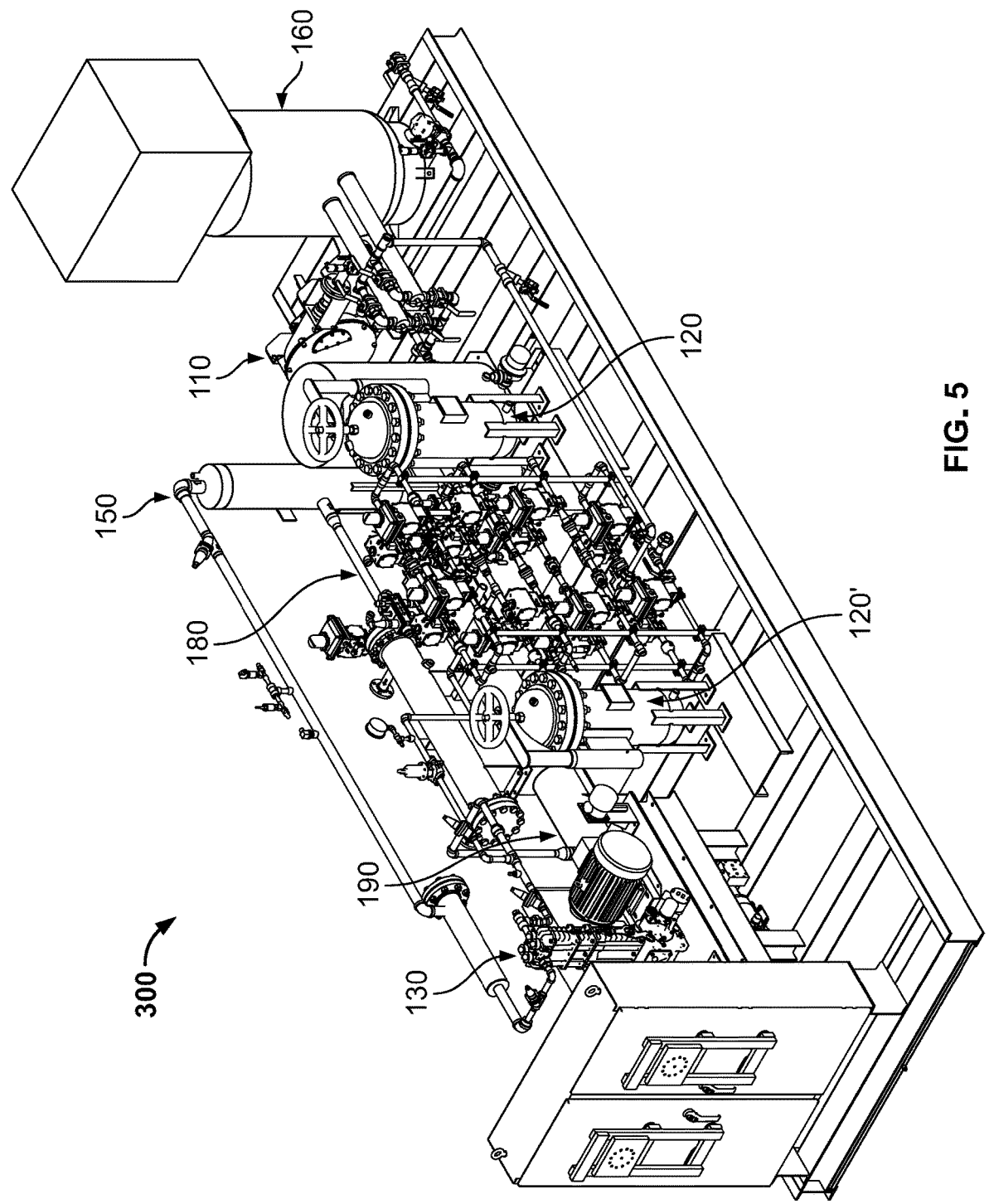
FIG. 5 is a perspective view of a water treatment system embodying aspects of the system of FIG. 4.
Figure 6:
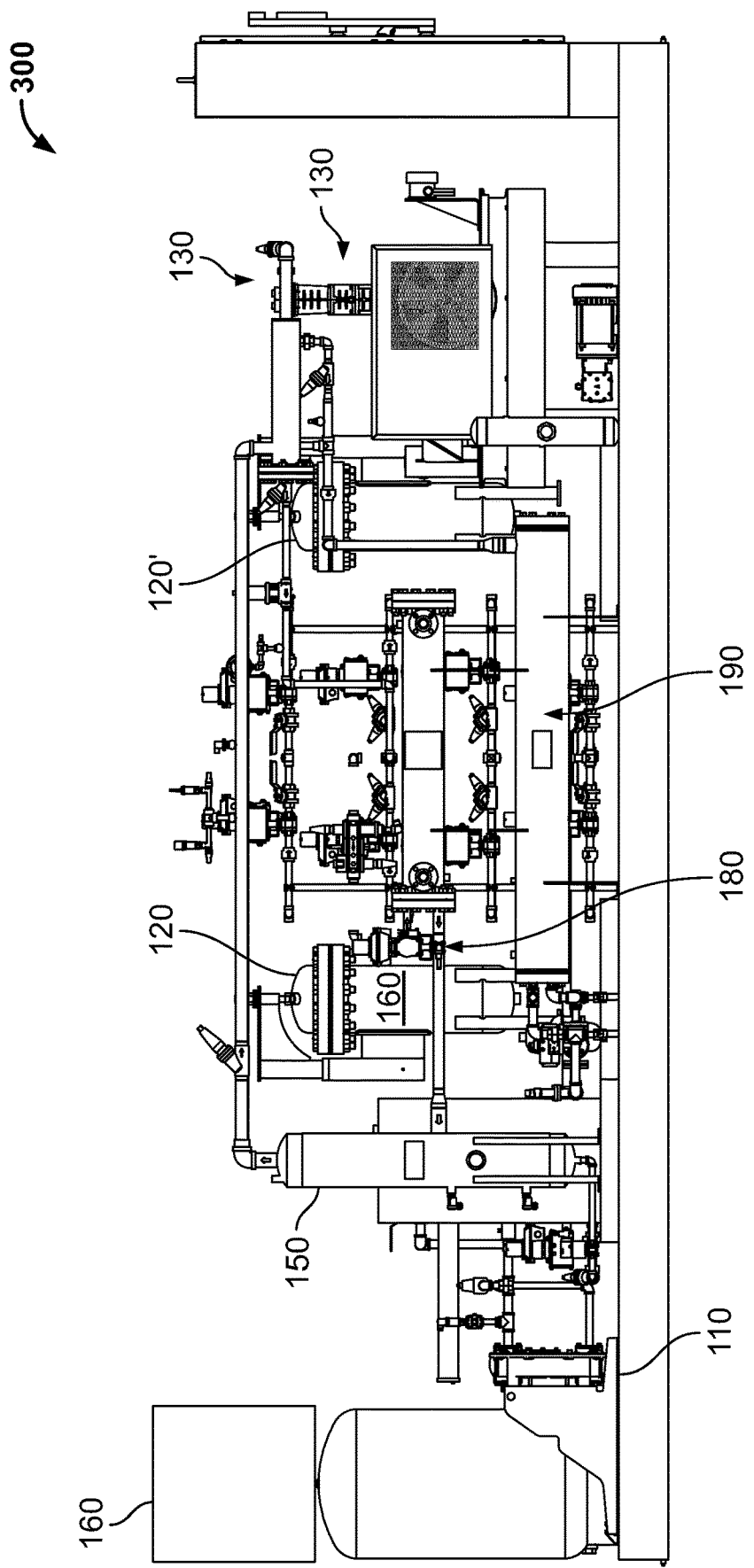
FIG. 6 is a side elevation of the system of FIG. 5.

FIGS. 4-6 illustrate another embodiment of a system in accordance with aspects of the technology. System 300 is configured with a plurality of filter media vessels to treat a water supply in a substantially continuous manner. System 300 is configured with two filter media vessels (120 and 120'), and the process for treating water will generally follow that described with respect to the system 200 in FIG. 2. Operation of the system 300 may proceed as follows. Water from a water source 110 may be supplied to the filter media vessel 120 via conduit 112. When the water is being treated by filter media vessel 120, conduit 114' is closed so that the water is not sent to the filter media vessel 120'. Water continues to flow through vessel 120 and out conduit 142. The water is treated using filter media vessel 120 until the filter media becomes saturated or partially saturated and is not effectively removing organic solutes from the water.

Once the filter media in vessel 120 is saturated or partially saturated, the system is operated to regenerate the filter media 122 in vessel 120. This can be carried out as described, for example, with respect to the system 200 in FIG. 2. In particular, the flow of water from water source 110 is stopped by closing valve 114. Vessel 120 can be purged with a gas to remove excess water from the vessel 120 and the filter media 122. After the gas purge of vessel 120, the displacement fluid can be supplied to the filter vessel 120 by opening valve 134 and flowing (e.g., pumping) the displacement fluid through conduit 132. As was described with system 200, the displacement fluid picks up the organic solutes from the filter media, and the displacement fluid containing the organic solutes is treated by reducing the pressure to a point that the displacement fluid is converted from a liquid to a gas such that the organic solutes desirably remain in a liquid state or drop out as solids. The recycled displacement fluid may be returned to the system via conduit 192.

System 300 is configured such that the flow of water from water source 110 is diverted to a different filter media vessel when filter media 122 in vessel 120 becomes saturated and valve 114 is closed. At that point, the system is controlled to open valve 114' to pass the water through conduit 112' to filter media vessel 120'. The filtered water leaving vessel 120' can exit the system via conduit 142'.

The water continues to be supplied to vessel 120' until the filter media 122' in vessel 120' becomes saturated or partially saturated. At that point, the filter media 122' can be regenerated by purging the vessel 120' of water with a gas from gas supply 160 and then supplying a displacement fluid to the filter media 122' in vessel 120'. The regeneration of filter media 122' may continue until it is determined that the filter media 122' has been regenerated.

Once the filter media 122 in vessel 120 is sufficiently regenerated, the flow of water to filter media vessel 120 can be restarted. Similarly, once the filter media 122' is regenerated, the flow of water to vessel 120' can be restarted. Thus, system 300 allows for the substantially continuous treatment of water by using one filter media vessel to treat water while the filter media in another filter media vessel is regenerated.

While the system 300 is shown as employing two filter media vessels, it will be appreciated that the number of filter media vessels is not necessarily so limited. The system 300 could employ two, three, four, five, or more filter media vessels. Additionally, a water source could be treated using a plurality of systems 300 at a given site. It will also be appreciated that the system 300 is for the purpose of illustrating aspects of the technology and is not limited to the specific arrangement as shown. For example, while the system is shown as using a single source 130 for the displacement fluid, organic solutes collection (150), and displacement fluid recycle (170), it will be appreciated that each filter media vessel may be separately connected to its own source for the displacement fluid and its own collection tanks for the organic solutes collection and for collecting the recycled displacement fluid.

Again, the portion of the system to facilitate separation of the organic solutes from the displacement fluid during the regeneration operation may be configured as desired depending on the displacement fluid being used and particularly whether the displacement fluid is a gas or a liquid during the regeneration operation.

As with the system 200, the system 300 may employ a control system, pumps, vacuum pumps, compressors, electronics, detectors, monitors, etc., as needed to operate the system. For example, the system can be automated to detect when a filter media is saturated, shut down the input of water, and begin the regeneration process, and then subsequently switch back from the regeneration phase to the water treatment phase. The systems can be automated and controlled and/or monitored remotely via a suitable computer, mobile device, etc.

The flow of the fluids in the system may be selected as desired for a particular purpose or intended application. In embodiments, the flow of the water through the system and the flow of the displacement fluid may be from the bottom to the top of the filter media vessel (i.e., against gravity), which will require the water or the displacement fluid to be forced through the filter media vessel with the assistance of a pump.

The filter media employed in the system is not particularly limited and may be selected as desired for a particular purpose or intended application. The filter media may generally be any porous filter media material suitable for bonding or having an affinity for organic compounds such as those that may be present in a water source. The filter media generally incorporates a porous structure that provides microbiological interception capability using an appropriate pore structure, charge material, chemical treatment, or a combination thereof. The porous structure comprises an array of active particles that have a specific pore structure, as well as adsorbent and/or absorbent properties. The array can be a solid composite block, a monolith, a ceramic candle, or a flat-sheet composite of bonded or immobilized particles formed into a coherent medium, all of which may use a binder or supporting bonding material. These particle arrays may be made through processes known in the art such as, for example, extrusion, molding, or slip casting.

The filter media may be swellable or non-swellable. Medias do not need to demonstrate the ability to swell in order to be regenerated, although swellability enhances regeneration properties. In general, porous materials, e.g., microporous or mesoporous, can be regenerated by displacement fluids. These include porous polymeric beads, organosilica and/or activated carbon, silica particles, functionalized sand, activated alumina, zeolites, silica gels, metal oxides, and commercially available sorbents such as, but not limited to, Dow Optipore L-493, Amberlite XAD-4, and similar organophilic polymeric sorbents. The constraint in the choice of an alternative media is that the porous media must not dissolve in the displacement fluid.

Previous patents have described the synthesis of porous, swellable organosilica medias that can be used to absorb organic solutes out of an aqueous phase for water treatment applications. Porous, swellable organosilica media are described in U.S. Pat. Nos. 7,790,830; 8,367,793; 8,119,759; 8,754,182; 8,921,504; 9,144,784; and PCT Publication No. WO 2013/019965, each of which is incorporated herein by reference in its entirety.

The media described in the above patents and published applications can be used in the present system and methods for water treatment and regeneration of the filter media. Specifically, water is passed through the media whereby organic solutes are removed by adsorption. The media can be regenerated by removing adsorbates with a displacement fluid.

Generally, media synthesized via a sol-gel derived process with a composition of 20-100% by weight of the first alkoxysilane precursor that is required to direct assembly:

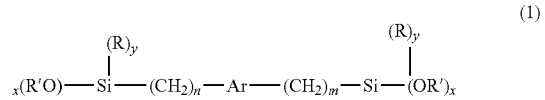

(1)

where:
$x=2, 3$;
$y=0, 1$;
$x+y=3$;
Ar=a single-, fused- or poly-aromatic ring;
R' is an alkyl group ranging from a $C_1$ to a $C_8$;
R is independently an organic group or alkyl functionality; and
n and m are individually an integer from 1 to 8 with 0-80% by weight of a second alkoxysilane precursor having the structure:

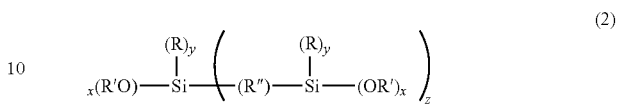

(2)

where:
$x=1, 2, 3, 4$;
$y=0, 1, 2, 3$;
$z=0, 1$;
$x+y+z=4$;
R is any organic functional group; either the same or different, if a plurality (i.e. $y=2$ or 3);
R' is independently an alkyl group, for example methyl, ethyl, or propyl groups; and
R" is any organic bridging group, for example an alkyl or aromatic bridging group.

Optimally, a ratio of ≥50% by mass of precursor (1) would be used to synthesize porous organosilica. The preferred precursor (1) is bis(trimethoxysilylethyl)benzene. Acid or base catalysts including fluoride, hydrochloric acid, amines, and hydroxide can be used. The preferred catalyst is fluoride. Any solvent that is miscible with water can be used, as water must be added in at least a stoichiometric amount relative to the precursor. The preferred solvent is acetone. The polymer mixture with solvent resembles a gel. The polymer gel is allowed to age at least 1 hr to further crosslinking. Prior to drying the polymer (gel) is treated with a reagent that silanizes (end-caps) residual Si—OH groups that have hydrolyzed, but not condensed to Si—O—Si during polymerization. Silanization is important to obtaining materials that swell. After silanization the material is dried. In some instances, polymer (gel) is not silanized prior to drying which leads to porous organosilica that has little or no ability to swell.

The resultant materials from polymerization of (1) or mixtures of (1) and (2) as described above are porous allowing for adsorption of organic molecules with molecular weights less than 750,000 Da. The ability of the final product to swell upon exposure to organic solvent can be controlled by post-synthesis processing steps.

Additionally, porous organosilica hybrid materials can also be used for water treatment with regeneration via a displacement fluid. Examples of these include organosilica medias, as described above, into which have been embedded particles of metals, metal oxides, polymers, catalysts, or particulates or colloidal particles encapsulated into the silica matrix. An example of a suitable hybrid organosilica material is described in U.S. Pat. No. 8,367,793.

Additionally, porous organosilica media that is coated and immobilized onto solid supports such as silica sand or foamed silica can be also be used for water treatment with regeneration via a displacement fluid. The porous organosilica may be comprised, for example, of polymerized (1) or mixtures of (1) and (2). The polymer is prepared as a colloidal suspension in a suitable solvent and aged at least 15 min before application to the support. Solid supports are coated with the colloidal suspension by wetting the material and evaporating the solvent, resulting in an absorbent porous silica coating. Preferred solid supports are silica materials which can allow bonding between the porous organosilica media layer and support.

It will be appreciated that a particular filter media may be more suitable for removing certain organic solutes from a water source and may have a relatively low affinity or no affinity for other organic solutes. Thus, it is contemplated that different types of filter media may be used in the system to attempt to maximize the number of organic solutes being extracted from the water. The different types of filter media may be provided in any suitable manner. For example, a filter media vessel may be provided with different types of filter media. The different filter media can be provided as a mixed media within the filter media vessel or the different filter media can be provided in separate zones within the filter media vessel. In an alternative embodiment, multiple filter media vessels each with a different filter media may be employed for treating the water. For example, the water can be passed through a first filter media vessel comprising a first filter media for removing a first set of one or more organic solutes, the water coming from the first media vessel may be passed to a second media vessel comprising a second filter media for removing a second set of one or more organic solutes that are different from the first set of organic solutes. The system could contain any number of different vessels with different filter media.

The displacement fluid for regenerating the filter media may be chosen as selected for a particular purpose or intended application. For example, the displacement fluid may be chosen based on the organic solutes adsorbed by the filter media and which need to be displaced from the filter media to regenerate the filter media for further use. In embodiments, the displacement fluid has a lower boiling point than the organic solutes being removed from the water by the filter media.

Examples of suitable materials for the displacement fluid include, but are not limited to, saturated fluorocarbons, unsaturated fluorocarbons, chlorofluorocarbons, hydrochlorofluorocarbons, fluoroethers, hydrocarbons, carbon dioxide, nitrogen, argon, dimethyl ether, ammonia, iodotrifluoromethane, or a combination of two or more thereof. A given class or specific displacement fluid may not be suitable for removing all the adsorbed organic solutes from a filter media as a given class or specific displacement fluid may not have a high affinity for all organic solutes adsorbed by a filter media. As such, it may be useful or desirable in some instances to use a mixture of/multiple displacement fluid materials to facilitate removal of the organic solutes from the filter media. A mixture of displacement fluid materials may be provided in any suitable manner. In one embodiment, it may be a physical mixture of displacement fluids that are simultaneously supplied to the filter media to facilitate removal of the organic solute.

In one embodiment, multiple displacement fluid materials may be used to remove organic solutes from the filter media via a multi-stage regeneration operation. In a multi-stage regeneration operation, the regeneration step may comprise:

treating the filter media with a first displacement fluid to remove a first set of organic solutes; and treating the filter media with a second displacement fluid to remove a second set of organic solutes.

It will be appreciated that a set of organic solutes refers to one or more organic solutes that are removable by a particular displacement fluid. In a multi-step regeneration operation, the method may include subsequently treating each displacement fluid containing the organic solutes accordingly to separate the organic solutes from the displacement fluid. In a multi-step regeneration operation, treatment with the different displacement fluids may be accomplished by simultaneously administering the different displacement fluids to the filter media (as a mixture or via separate inlets but at the same time) or in successive treatment steps. In one embodiment, the displacement fluids are administered separately and successively with substantially no break in the regeneration operation. In another embodiment, a multi-step regeneration process comprises administering a first displacement fluid to remove a first set of organic solutes; purging the system following treatment with the first displacement fluid; and administering a second displacement fluid to remove a second set of organic solutes. It will be appreciated that a multi-stage regeneration operation is not limited to the use of two displacement fluids and may include any number of displacement fluids as desired for a particular purpose to remove the organic solutes of interest in the fluid being treated. A multi-stage regeneration treatment operation may include 2, 3, 4, 5, 6, or more different displacement fluids.

Additionally, it may be an option to remove an organic solute of interest with a first displacement fluid, and then a second displacement fluid is passed through the system to remove the first displacement fluid. That is, the first displacement fluid, may itself be an organic solute that will require subsequent removal from the system.

Examples of hydrocarbons suitable as the displacement fluid include, but are not limited to, lower alkanes such as methane, ethane, propane, cyclopropane, propylene, n-butane, cyclobutane, 2-methylpropane, methylcyclopropane, n-pentane, cyclopentane, 2-methylbutane, methylcyclobutane, 2,2-dimethylpropane, dimethylcyclopropane isomers, or a combination of two or more thereof.

Representative chlorofluorocarbon refrigerants or heat transfer fluids include trichlorofluoromethane (CFC-11), dichlorodifluoromethane (CFC-12), 1,1,1-trichlorotrifluoroethane (CFC-113a), 1,1,2-trichlorotrifluoroethane (CFC-113), and chloropentafluoroethane (CFC-115).

Representative hydrochlorofluorocarbon refrigerants or heat transfer fluids include chlorodifluoromethane (HCFC-22), 2-chloro-1,1,1-trifluoroethane (HCFC-123), 2-chloro-1,1,2-tetrafluoroethane (HCFC-124) and 1-chloro-1,1-difluoroethane (HCFC-142b).

Representative fluoroether refrigerants or heat transfer fluids include $CF_3OCHF_2$, $CF_3OCH_3$, $CF_3OCH_2F$, $CHF_2OCHF_2$, cyclo-$(CF_2CF_2CF_2O—)$, $CF_3CF_2OCH_3$, $CHF_2OCHFCF_3$, $CHF_2CF_2OCH_3$, $C_4F_9OCH_3$, $C_4F_9OC_2H_5$, $CF_3OCF_3$, $CF_3OC_2F_5$, $C_2F_5OC_2F_5$ and $CF_3OCF(CF_3)CF(CF_3)OCF_3$.

The present invention provides unsaturated fluorocarbons having the formula E- or Z—$R^1CH$=$HR^2$ (Formula I), wherein $R^1$ and $R^2$ are, independently, $C_1$ to $C_6$ perfluoroalkyl groups. Examples of $R^1$ and $R^2$ groups include, but are not limited to, $CF_3$, $C_2F_5$, $CF_2CF_2CF_3$, $CF(CF_3)_2$, $CF_2CF_2CF_2CF_3$, $CF(CF_3)CF_2CF_3$, $CF_2CF(CF_3)_2$, $C(CF_3)_3$, $CF_2CF_2CF_2CF_2CF_3$, $CF_2CF_2CF(CF_3)_2$, $C(CF_3)_2C_2F_5$, $CF_2CF_2CF_2CF_2CF_2CF_3$, $CF(CF_3)$ $CF_2CF_2C_2F_5$, and $C(CF_3)_2CF_2C_2F_5$. In one embodiment the unsaturated fluorocarbons of Formula I, have at least about 4 carbon atoms in the molecule. In another embodiment, the unsaturated fluorocarbons of Formula I have at least about 5 carbon atoms in the molecule.

Exemplary, non-limiting Formula I compounds include: F11E (1,1,1,4,4,4-hexafluorobut-2-ene); F12E (1,1,1,4,4,5,5,5-octafluoropent-2-ene); F13E (1,1,1,4,4,5,5,6,6,6-decafluorohex-2-ene); F13iE (1,1,1,4,5,5,5-heptafluoro-4-(trifluoromethyl)pent-2-ene); F22E (1,1,1,2,2,5,5,6,6,6- decafluorohex-3-ene); F14E (1,1,1,4,4,5,5,6,6,7,7-dodecafluorohept-2-ene); F14iE (1,1,1,4,4,5,6,6,6-nonafluoro-5-(trifluoromethyl)hex-2-ene); F14sE (1,1,1,4,5,5,6,6,6-nonfluoro-4-(trifluoromethyl)hex-2-ene); F14tE (1,1,1,5,5,5-hexafluoro-4,4-bis(trifluoromethyl)pent-2-ene); F23E (1,1,1,2,2,5,5,6,6,7,7,7-dodecafluorohept-3-ene); F23iE (1,1,1,2,2,5,6,6,6-nonafluoro-5-(trifluoromethyl)hex-3-ene); F15E (1,1,1,4,4,5,5,6,6,7,7,8,8,8-tetradecafluorooct-2-ene); F15iE (1,1,1,4,4,5,5,6,7,7,7-undecafluoro-6-(trifluoromethyl)hept-2-ene); F15tE (1,1,1,5,5,6,6,6-octafluoro-4,4-bis(trifluoromethyl)hex-2-ene); F24E (1,1,1,2,2,5,5,6,6,7,7,8,8,8-tetradecafluorooct-3-ene); F24iE (1,1,1,2,2,5,5,6,7,7,7-undecafluoro-6-(trifluoromethyl)hept-3-ene); F24sE (1,1,1,2,2,5,6,6,7,7,7-undecafluoro-5-(trifluoromethyl)hept-3-ene); F24tE (1,1,1,2,2,6,6,6-octafluoro-5,5-bis(trifluoromethyl)hex3ene); F33E (1,1,1,2,2,3,3,6,6,7,7,8,8,8-tetradecafluorooct-4-ene); F3i3iE (1,1,1,2,5,6,6,6-octafluoro-2,5-bis(trifluoromethyl)hex-3-ene); F33iE (1,1,1,2,5,5,6,6,7,7,7-undecafluoro-2-(trifluoromethyl)hept-3-ene); F16E (1,1,1,4,4,5,5,6,6,7,7,8,8,9,9,9-hexadecafluoronon-2-ene); F16sE (1,1,1,4,5,5,6,6,7,7,8,8,8-tridecafluoro-4-(trifluoromethyl)hept-2-ene); F16tE (1,1,1,6,6,6-octafluoro-4,4-bis(trifluoromethyl)hept-2-ene); F25E (1,1,1,2,2,5,5,6,6,7,7,8,8,9,9,9-hexadecafluoronon-3-ene); F25iE (1,1,1,2,2,5,5,6,6,7,8,8,8-tridecafluoro-7-(trifluoromethyl)oct-3-ene); F25tE (1,1,1,2,2,6,6,7,7,7-decafluoro-5,5-bis(trifluoromethyl)heptane); F34E (1,1,1,2,2,3,3,6,6,7,7,8,8,9,9,9-hexadecafluoronon-4-ene); F34iE (1,1,1,2,2,3,3,6,6,7,8,8,8-tridecafluoro-7-(trifluoromethyl)oct-4-ene); F34sE (1,1,1,2,2,3,3,6,7,7,8,8,8-tridecafluoro-6-(trifluoromethyl)oct-4-ene); F34tE (1,1,1,5,5,6,6,7,7,7-decafluoro-2,2-bis(trifluoromethyl)hept-3-ene); F3i4E (1,1,1,2,5,5,6,6,7,7,8,8,8-tridecafluoro-2(trifluoromethyl)oct-3-ene); F3i4iE (1,1,1,2,5,5,6,7,7,7-decafluoro-2,6-bis(trifluoromethyl)hept-3-ene); F3i4sE (1,1,1,2,5,6,6,7,7,7-decafluoro-2,5-bis(trifluoromethyl)hept-3-ene); F3i4tE (1,1,1,2,6,6,6-heptafluoro-2,5,5-tris(trifluoromethyl)hex-3-ene); F26E (1,1,1,2,2,5,5,6,6,7,7,8,8,9,9,10,10,10-octadecafluorodec-3-ene); F26sE (1,1,1,2,2,5,6,6,7,7,8,8,9,9,9-pentadecafluoro-5-(trifluoromethyl)non-3-ene); F26tE (1,1,1,2,2,6,6,7,7,8,8,8-dodecafluoro-5,5-bis(trifluoromethyl)oct-3-ene); F35E (1,1,1,2,2,3,3,6,6,7,7,8,8,9,9,10,10,10-octadecafluorodec-4-ene); F35iE (1,1,1,2,2,3,3,6,6,7,7,8,9,9,9-pentadecafluoro-8-(trifluoromethyl)non-4-ene); F35tE (1,1,1,2,2,3,3,7,7,8,8,8-dodecafluoro-6,6-bis(trifluoromethyl)oct-4-ene); F3i5E (1,1,1,2,5,5,6,6,7,7,8,8,9,9,9-pentadecafluoro-2-(trifluoromethyl)non-3-ene); F3i5iE (1,1,1,2,5,5,6,6,7,8,8,8-dodecafluoro-2,7-bis(trifluoromethyl)oct-3-ene); F3i5tE (1,1,1,2,6,6,7,7,7-nonafluoro-2,5,5-tris(trifluoromethyl)hept-3-ene); F44E (1,1,1,2,2,3,3,4,4,7,7,8,8,9,9,10,10,10-octadecafluorodec-5-ene); F44iE (1,1,1,2,3,3,6,6,7,7,8,8,9,9,9-pentadecafluoro-2-(trifluoromethyl)non-4-ene); F44sE (1,1,1,2,2,3,3,6,6,7,7,8,8,9,9,9-pentadecafluoro-3-(trifluoromethyl)non-4-ene); F44tE (1,1,1,5,5,6,6,7,7,8,8,8-dodecafluoro-2,2,-bis(trifluoromethyl)oct-3-ene); F4i4iE (1,1,1,2,3,3,6,6,7,7,8,8,8-dodecafluoro-2,7-bis(trifluoromethyl)oct-4-ene); F4i4sE (1,1,1,2,3,3,6,7,7,8,8,8-dodecafluoro-2,6-bis(trifluoromethyl)oct-4-ene); F4i4tE (1,1,1,5,5,6,7,7,7-nonafluoro-2,2,6-tris(trifluoromethyl)hept-3-ene); F4s4sE (1,1,1,2,2,3,6,7,7,8,8,8-dodecafluoro-3,6-bis(trifluoromethyl)oct-4-ene); F4s4tE (1,1,1,5,6,6,7,7,7-nonafluoro-2,2,5-tris(trifluoromethyl)hept-3-ene); F4t4tE (1,1,1,6,6,6-hexafluoro-2,2,5,5-tetrakis(trifluoromethyl)hex-3-ene); FC-C1316cc (1,2,3,3,4,4-hexafluorocyclobutene); HFC-C1334cc 3,3,4,4-tetrafluorocyclobutene); FC-C1436 (3,3,4,4,5,5,-hexafluorocyclopentene); FC-C1418y (1,2,3,3,4,4,5-octafluorocyclopentene); FC-C151-10y (1,2,3,3,4,4,5,5,6,6-decafluorocyclohexene); HFC-1225ye (1,2,3,3,3-pentafluoro-1-propene); HFC-1225zc (1,1,3,3,3-pentafluoro-1-propene); HFC-1225yc (1,1,2,3,3-pentafluoro-1-propene); HFC-1234ye (1,2,3,3-tetrafluoro-1-propene); HFC-1234yf (2,3,3,3-tetrafluoro-1-propene); HFC-1234ze (1,3,3,3-tetrafluoro-1-propene); HFC-1234yc (1,1,2,3-tetrafluoro-1-propene); HFC-1234zc (1,1,3,3-tetrafluoro-1-propene); HFC-1243yf (2,3,3-trifluoro-1-propene); HFC-1243zf (3,3,3-trifluoro-1-propene); HFC-1243yc (1,1,2-trifluoro-1-propene); HFC-1243zc (1,1,3-trifluoro-1-propene); HFC-1243ye (1,2,3-trifluoro-1-propene); HFC-1243ze (1,3,3-trifluoro-1-propene); FC-1318my (1,1,1,2,3,4,4,4-octafluoro-2-butene); FC-1318cy (1,1,2,3,3,4,4,4-octafluoro-1-butene); HFC-1327my (1,1,1,2,4,4,4-heptafluoro-2-butene); HFC-1327ye (1,2,3,3,4,4,4-heptafluoro-1-butene); HFC-1327py (1,1,1,2,3,4,4-heptafluoro-2-butene); HFC-1327et (1,3,3,3-tetrafluoro-2-(trifluoromethyl)-1-propene); HFC-1327cz (1,1,3,3,4,4,4-heptafluoro-1-butene); HFC-1327cye (1,2,3,3,4,4,4-heptafluoro-1-butene); HFC-1327cyc (1,2,3,3,4,4,4-heptafluoro-1-butene); HFC-1336yf (2,3,3,4,4,4-hexafluoro-1-butene); HFC-1336ze (1,3,3,4,4,4-hexafluoro-1-butene); HFC-1336eye (1,2,3,4,4,4-hexafluoro-1-butene); HFC-1336eyc (1,2,3,3,4,4-hexafluoro-1-butene); HFC-1336pyy (1,1,2,3,4,4-hexafluoro-2-butene); HFC-1336qy (1,1,1,2,3,4-hexafluoro-2-butene); HFC-1336pz (1,1,1,2,4,4-hexafluoro-2-butene); HFC-1336mzy (1,1,1,3,4,4-hexafluoro-2-butene); HFC-1336qc (1,1,2,3,3,4-hexafluoro-1-butene); HFC-1336pe (1,1,2,3,4,4-hexafluoro-1-butene); HFC-1336 ft (3,3,3-trifluoro-2-(trifluoromethyl)-1-propene); HFC-1345qz (1,1,1,2,4-pentafluoro-2-butene); HFC-1345mzy (1,1,1,3,4-pentafluoro-2-butene); HFC-1345fz (3,3,4,4,4-pentafluoro-1-butene); HFC-1345mzz (1,1,1,4,4-pentafluoro-2-butene); HFC-1345sy (1,1,1,2,3-pentafluoro-2-butene); HFC-1345fyc (2,3,3,4,4-pentafluoro-1-butene); HFC-1345pyz (1,1,2,4,4-pentafluoro-2-butene); HFC-1345cyc (1,1,2,3,3-pentafluoro-1-butene); HFC-1345pyy (1,1,2,3,4-pentafluoro-2-butene); HFC-1345eyc (1,2,3,3,4-pentafluoro-1-butene); HFC-1345ctm (1,1,3,3,3-pentafluoro-2-methyl-1-propene); HFC-1345ftp (2-(difluoromethyl)-3,3,3-trifluoro-1-propene); HFC1345fye (2,3,4,4,4-pentafluoro-1-butene); HFC-1345eyf (1,2,4,4,4-pentafluoro-1-butene); HFC-1345eze (1,3,4,4,4-pentafluoro-1-butene); HFC-1345ezc (1,3,3,4,4-pentafluoro-1-butene); HFC-1345eye (1,2,3,4,4-pentafluoro-1-butene); HFC-1354fzc (3,3,4,4-tetrafluoro-1-butene); HFC-1354ctp (1,1,3,3-tetrafluoro-2-methyl-1-propene); HFC-1354etm (1,3,3,3-tetrafluoro-2-methyl-1-propene); HFC-1354tfp (2-(difluoromethyl)-3,3-difluoro-1-propene); HFC-1354my (1,1,1,2-tetrafluoro-2-butene); HFC-1354mzy (1,1,1,3-tetrafluoro-2-butene); FC-1410myy (1,1,1,2,3,4,4,5,5,5-decafluoro-2-pentene); FC-1410cy (1,1,2,3,3,4,4,5,5,5-decafluoro-1-pentene); HFC-1429mzt (1,1,1,4,4,4-hexafluoro-2-(trifluoromethyl)-2-butene); HFC-1429myz (1,1,1,2,4,4,5,5,5-nonafluoro-2-pentene); HFC-1429mzy (1,1,1,3,4,4,5,5,5-nonafluoro-2-pentene); HFC-1429eyc (1,2,3,3,4,4,5,5,5-nonafluoro-1-pentene); HFC-1429czc (1,1,3,3,4,4,5,5,5-nonafluoro-1-pentene); HFC-1429cycc (1,1,2,3,3,4,4,5,5-nonafluoro-1-pentene); HFC-1429pyy (1,1,2,3,4,4,5,5,5-nonafluoro-2-pentene); HFC-1429myyc (1,1,1,2,3,4,4,5,5-nonafluoro-2-pentene); HFC-1429myye (1,1,1,2,3,4,5,5,5-nonafluoro-2-pentene); HFC-1429eyym (1,2,3,4,4,4-hexafluoro-3-(trifluoromethyl)-1-butene); HFC-1429cyzm (1,1,2,4,4,4-hexafluoro-3-(trifluoromethyl)-1-butene); HFC-1429mzt (1,1,1,4,4,4-hexafluoro-2-(trifluoromethyl)-2-butene); HFC-1429czym (1,1,3,4,4,4-hexafluoro-3-(trifluoromethyl)-1- butene); HFC-1438fy (2,3,3,4,4,5,5,5-octafluoro-1-pentene); HFC-1438eycc (1,2,3,3,4,4,5,5-octafluoro-1-pentene); HFC-1438ftmc (3,3,4,4,4-pentafluoro-2-(trifluoromethyl)-1-butene); HFC-1438czzm (1,1,4,4,4-pentafluoro-3-(trifluoromethyl)-1-butene); HFC-1438ezym (1,3,4,4,4-pentafluoro-3-(trifluoromethyl)-1-butene); HFC-1438ctmf (1,1,4,4,4-pentafluoro-2-(trifluoromethyl)-1-butene); HFC-1447fzy (3,4,4,4-tetrafluoro-3-(trifluoromethyl)-1-butene); HFC-1447fz (3,3,4,4,5,5,5-heptafluoro-1-pentene); HFC-1447fycc (2,3,3,4,4,5,5-heptafluoro-1-pentene); HFC-1447czcf (1,1,3,3,5,5,5-heptafluoro-1-pentene); HFC-1447mytm (1,1,1,2,4,4,4-heptafluoro-3-methyl-2-butene); HFC-1447fyz (2,4,4,4-tetrafluoro-3-(trifluoromethyl)-1-butene); HFC-1447ezz (1,4,4,4-tetrafluoro-3-(trifluoromethyl)-1-butene); HFC-1447qzt (1,4,4,4-tetrafluoro-2-(trifluoromethyl)-2-butene); HFC-1447syt (2,4,4,4-tetrafluoro-2-(trifluoromethyl)-2-butene); HFC-1456szt (3-trifluoromethyl)-4,4,4-trifluoro-2-butene); HFC-1456szy (3,4,4,5,5,5-hexafluoro-2-pentene); HFC-1456mstz (1,1,1,4,4,4-hexafluoro-2-methyl-2-butene); HFC-1456fzce (3,3,4,5,5,5-hexafluoro-1-pentene); HFC-1456ftmf (4,4,4-trifluoro-2-(trifluoromethyl)-1-butene); FC-151-12c (1,1,2,3,3,4,4,5,5,6,6,6-dodecafluoro-1-hexene (or perfluoro-1-hexene)); FC-151-12mcy (1,1,1,2,2,3,4,5,5,6,6,6-dodecafluoro-3-hexene (or perfluoro-3-hexene)); FC-151-12mmtt (1,1,1,4,4,4-hexafluoro-2,3-bis(trifluoromethyl)-2-butene); FC-151-12mmzz (1,1,1,2,3,4,5,5,5-nonafluoro-4-(trifluoromethyl)-2-pentene; HFC-152-11mmtz (1,1,1,4,4,5,5,5-octafluoro-2-(trifluoromethyl)-2-pentene); HFC-152-11mmyyz (1,1,1,3,4,5,5,5-octafluoro-4-(trifluoromethyl)-2-pentene); PFBE (3,3,4,4,5,5,6,6,6-nonafluoro-1-hexene (or (or HFC-1549fz) perfluorobutylethylene)); HFC-1549fztmm (4,4,4-trifluoro-3,3-bis(trifluoromethyl)-1-butene); HFC-1549mmtts (1,1,1,4,4,4-hexafluoro-3-methyl-2-(trifluoromethyl)-2-butene); HFC-1549fycz (2,3,3,5,5,5-hexafluoro-4-(trifluoromethyl)-1-pentene); HFC-1549myts (1,1,1,2,4,4,5,5,5-nonafluoro-3-methyl-2-pentene); HFC-1549mzzz (1,1,1,5,5,5-hexafluoro-4-(trifluoromethyl)-2-pentene); HFC-1558szy (3,4,4,5,5,6,6,6-octafluoro-2-hexene); HFC-1558fzccc (3,3,4,4,5,5,6,6-octafluoro-2-hexene); HFC-1558mmtzc (1,1,1,4,4-pentafluoro-2-(trifluoromethyl)-2-pentene); HFC-1558ftmf (4,4,5,5,5-pentafluoro-2-(trifluoromethyl)-1-pentene); HFC-1567fts (3,3,4,4,5,5,5-heptafluoro-2-methyl-1-pentene); HFC-1567szz (4,4,5,5,6,6,6-heptafluoro-2-hexene); HFC-1567fzfc (4,4,5,5,6,6,6-heptafluoro-1-hexene); HFC-1567sfyy (1,1,1,2,2,3,4-heptafluoro-3-hexene); HFC-1567fzfy (4,5,5,5-tetrafluoro-4-(trifluoromethyl)-1-pentene); HFC-1567myzzm (1,1,1,2,5,5,5-heptafluoro-4-methyl-2-pentene); HFC-1567mmtyf (1,1,1,3-tetrafluoro-2-(trifluoromethyl)-2-pentene); FC-161-14myy (1,1,1,2,3,4,4,5,5,6,6,7,7,7-tetradecafluoro-2-heptene); FC-161-14mcyy (1,1,1,2,2,3,4,5,5,6,6,7,7,7-tetradecafluoro-2-eptene); HFC-162-13mzy (1,1,1,3,4,4,5,5,6,6,7,7,7-tridecafluoro-2-heptene); HFC162-13myz (1,1,1,2,4,4,5,5,6,6,7,7,7-tridecafluoro-2-heptene); HFC-162-13mczy (1,1,1,2,2,4,5,5,6,6,7,7,7-tridecafluoro-3-heptene); HFC-162-13mcyz (1,1,1,2,2,3,5,5,6,6,7,7,7-tridecafluoro-3-heptene); PEVE (pentafluoroethyl trifluorovinyl ether); PMVE (trifluoromethyl trifluorovinyl ether).

The system and method can be used to remove a variety of organic solutes from a water based source. The water source may include, but is not limited to, industrial process water, oil and gas produced water, groundwater remediation, etc. Common organic solutes found in industrial process water include agrochemicals, dye precursors and intermediates, halogenated and non-halogenated solvents, halogenated species, hydrocarbons, plasticizers, plastics monomers, and volatile organic compounds (VOC's). Organic solutes found in oil and gas produced water include BTEX, dispersed oil, hydrocarbons, and non-ionic surfactants. Examples of organic solutes found in groundwater remediation include chlorinated solvents, explosives and munitions, non-ionic pharmaceuticals, pefluorinated species, polychlorinated biphenyls, and polycyclic aromatic hydrocarbons.

As previously described, the displacement fluid may be employed as either a liquid or a gas during the regeneration operation.

Examples of organic solutes that the process and system may remove from a water source include, but are not limited to, acenaphthene, acenaphthylene, aldrin, anthracene, benzene, benzidine, benzo[a]anthracene, benzo[a]pyrene, benzo[b]fluoranthene, benzo[ghi]perylene, benzo[k]fluoranthene, Y-BHC, bis(2-chloroethoxy)methane, bis(2-chloroethyl) ether, bis(2-chloroisopropyl) ether, bis(2-ethylhexyl) phthalate, bromoform, 4-bromophenyl phenyl ether, butyl benzyl phthalate, carbon tetrachloride, chlordane, chlorobenzene, p-chlorocresol, chlorodibromomethane, chloroethane, 2-chloroethyl vinyl ether, chloroform, 2-chloronaphthalene, 2-chlorophenol, 4-chlorophenyl phenyl ether, chrysene, dibenzo[h]anthracene, 3,3'-dichlorobenzidine, 1,2-dichlorobenzene, 1,3-dichlorobenzene, 1,4-dichlorobenzene, dichlorobromomethane, dichlorodiphenyldichloroethane, dichlorodiphenyltrichloroethane, dichlorodiphenyldichloroethylene, 1,1-dichloroethane, 1,2-dichloroethane, 1,1-dichloroethylene, 1,2-dichloropropane, 1,3-dichloropropylene, dieldrin, diethyl phthalate, 2,4-dimethylphenol, dimethyl phthalate, di-n-butyl phthalate, 4,6-dinitro-o-cresol, 2,4-dinitrophenol, 2,4-dinitrotoluene, 2,6-dinitrotoluene, di-n-octyl phthalate, 1,2-diphenylhydrazine, α-endosulfan, β-endosulfan, endosulfan sulfate, endrin, endrin aldehyde, essential oils (e.g., sandalwood oil, orange oil, cannabis oil, tobacco oil), ethylbenzene, fluoranthene, flavor molecules (e.g., ethyl decadienoate, methyl anthranilate, benzaldehyde, etc), fragrance molecules (e.g., limonene, pinene, anisole, linalool, myrcene, etc.), heptachlor, heptachlor epoxide, hexachlorobenzene, hexachlorobutadiene, α-hexachlorocyclohexane, β-hexachlorocyclohexane, δ-hexachlorocyclohexane, hexachloroethane, indeno[1,2,3-cd]pyrene, isophorone, methylene chloride, naphthalene, nitrobenzene, 2-nitrophenol, 4-nitrophenol,N-nitroso-di-n-propylamine, N-nitrosodiphenylamine, PCB-1016, PCB-1221, PCB-1232, PCB-1242, PCB-1248, PCB-1254, PCB-1260, pentachlorophenol, phenanthrene, pyrene, 2,3,7,8-tetrachlorodibenzo-p-dioxin, 1,1,2,2-tetrachloroethane, tetrachloroethylene, toluene, toxaphene, trichloroacetonitrile, 1,2,4-trichlorobenzene, 1,1,1-trichloroethane, 1,1,2-trichloroethane, trichloroethylene, 2,4,6-trichlorophenol, vinyl chloride, acetochlor, aniline, bensulide, benzyl chloride, 1,3-butadiene, butylated hydroxyanisole, sec-butylbenzene, cyanotoxins (microcystin LR), 1,3-dinitrobenzene, disulfoton, equilenin, estradiol, 17-α-estradiol, estriol, estrone, ethinyl estradiol, ethoprop, fenamiphos, α-hexachlorocyclohexane, hexane, mestranol, 4,4'-methylenedianiline, metolachlor, molinate, nitrobenzene, N-nitrosodiphenylamine, norethindrone, oxyfluorfen, perfluorooctane sulfonic acid, perfluorooctanoic acid, permethrin, profenofos, n-propylbenzene, quinoline, tebuconazole, tebufenozide, 1,1,1,2-tetrachloroethane, terbufos, terbufos sulfone, toluene, diisocyanate, tribufos, 1,2,3-trichloropropane, vinclozolin, etc.

The vessels/housings for the different components in the system may be selected as desired. Desirably, the material for the vessels/housing is constructed in a manner that is suitable to withstand the pressures and temperatures being employed during the various operations. Additionally, the vessels should be able to tolerate the chemicals and materials being passed through (e.g., the displacement fluid). Examples of suitable materials for the vessels/housings include, but are not limited to, stainless steel, ceramics, polymers, etc.

Operating parameters for the various operations to treat the water, regenerate the filter media, convert the displacement fluid to the appropriate state of matter for a given step, etc., may be selected as desired based on the materials being used including the filter media being used and the displacement fluid being used. For example, the conditions to condense the displacement fluid from a gas to a liquid and subsequently to vaporize the liquid displacement fluid containing the contaminants removed from the filter media back to a gaseous state will depend on the displacement fluid used in the regeneration process. It will be within the capability of those skilled in the art to determine those conditions.

The flow rate of the water through the filter media can be selected as desired for a particular purpose or intended application. The flow rate is not particularly limited and in embodiments can be, for example, 0.5 L/min; 1 L/min; 2.5 L/min; 5 L/min; 10 L/min; 50 L/min; 100 L/min; 250 L/min; even 500 L/min.

A system for treating water and regenerating the filter media may be used for numerous treatment cycles. A treatment cycle can be defined as a completed water treatment and filter media regeneration process. In embodiments, the system and method can provide for up to 100 treatment cycles; up to 150 treatment cycles; up to 200 treatment cycles; up to 300 treatment cycles; up to 500 treatment cycles; up to 750 treatment cycles; even up to 1000 treatment cycles.

Thus, the present systems and method provide for the treatment of water with a filter media and the regeneration of the filter media for subsequent treatment of water. The systems and method also provide for the substantially continuous treatment of water. This allows for avoiding significant downtime in the water treatment process. The ability to regenerate filter media and to treat water on a substantially continuous basis can significantly reduce the costs associated with treatment of water as well as allow for increased throughput of water for treatment.

EXAMPLES

Example 1

The unit has a centrifugal pump that pushes contaminated water, bottom to top, through a stainless steel vessel filled with organosilica media (particle size range 20-80 US mesh). The stainless steel vessel holding the media has a stainless steel bottom screen, 100 mesh, and a top stainless steel screen of the same size. The vessel holds a total of 400 grams of media. The water flow rate is 0.5 L per minute. The water is flowed through the media, and the media extracts organic solutes from the water, resulting in purified water in the effluent. The unit treats 7 gallons of contaminated water per cycle. A cycle is defined as a completed water treatment and media regeneration process.

Post water-treatment, the regeneration process starts by purging the remaining water inside the stainless steel vessel that holds the media. This operation is accomplished with compressed air at ambient temperature and 25 psi. Air pushes the water from top to bottom, draining the vessel out. After the organosilica media has been purged out of water, the unit proceeds to vacuuming the vessel to remove all air. This procedure is completed when −12 psi has been reached. The system checks for leaks for 2 minutes before it starts to fill up the vessel with liquid propane, which is accomplished with a pneumatic gas compressor. The unit takes propane gas from a reservoir and compresses it to 180 psi. In order to condensate the propane, the gas goes through two heat exchangers and condensers. This brings the temperature of the gas to 10° C., changing the phase from gas to liquid. The propane in a liquid phase is pushed into the media vessel.

Once 180 psi is reached inside the media vessel, the unit starts the looping process. This step consists of looping the liquid propane through the organosilica media bed at 150 psi. The liquid propane flows through the media from bottom to top, backflushing the organic solutes previously absorbed by the organosilica media during the water treatment step. The liquid propane, now with the organic solutes (s) dissolved into it, leaves the media vessel through an expansion valve located at the top of the vessel and expands into a secondary container where the pressure is approximately 35 psi. The secondary container is called the organic solutes vessel. The liquid propane carrying the organic solutes(s) goes through a flash evaporation. The propane changes phase, from liquid to gas, dropping the organic solutes(s) backflushed from the organosilica media. This propane gas is again drawn by the compressor that compresses it, followed by a condenser that turns it into liquid again. The system does this for 30 minutes. With this procedure the organic solutes absorbed by the organosilica media during water treatment gets collected in the organic solutes vessel.

Once the organosilica media has been fully regenerated, the system recovers the propane used in backflushing the organic solutes. To accomplish this the unit loops warm propane gas at 80 psi and 45° C. through the organosilica media bed bypassing the condenser. This facilitates the phase change of liquid propane to propane gas inside the media vessel. Once all the propane has been vaporized the system stores the propane in a recycle vessel for reuse purposes. The organosilica media is now ready for treating contaminated water again.

Example 2

Osorb® filter media available from ABS Materials (Wooster, Ohio) contained within a multi purpose processing chamber is treated with liquid butane in a continuous flow. The purpose of the liquid butane is to displace captured chemical compounds absorbed into Osorb® media, regeneration of Osorb® media. The Osorb® media treated with liquid butane is relatively devoid of chemical compounds and suitable for further use in treating additional water influent which contains dissolved chemical compounds. The removed chemical compounds are concentrated in a recovery vessel where liquid butane is evaporated, turned into a gaseous state, and gaseous butane is returned to the system to be reused in the continuous flow of liquid butane through the multi purpose processing chamber.

DETAILED EXPLANATION

A multi purpose processing chamber is loaded with a charge of Osorb® media. Suitable screens are fitted on the ends of the multi purpose processing chamber to retain the Osorb® media. Influent water containing one or more organic solutes are passed through the Osorb® media in a bottom to top manner. One or more organic solutes are removed from the influent water stream and absorbed by the Osorb® media producing a cleaned effluent water stream. When the Osorb® media is near break through condition the system is switched to an alternative multi purpose processing chamber loaded with Osorb® media. The processing of influent water is not interrupted.

The Osorb® media laden with organic solutes within the multi purpose processing chamber is evacuated of influent water by opening and closing a valve system to introduce a pressurized inert gas, e.g., a nitrogen gas stream. The nitrogen gas stream is shut off and a vacuum is applied to the processing chamber through a series of valves. The processing chamber is evacuated to −12 psi by use of a vacuum pump. Liquid butane is added to the processing chamber from a liquid butane storage tank through a series of valves. Additional liquid butane is generated by use of a suitable compressor pump pulling gaseous butane from a storage tank and pumping against a restriction valve. Liquid butane is continuously pumped into the processing chamber, passing bottom to top, against gravity, through the bed of chemical laden Osorb® media. The flow of liquid butane displaces the adsorbed organic solutes from the chemical laden Osorb® media. The liquid butane carrying the organic solutes passes through the restriction valve and into an expansion chamber where the pressure is reduced and the liquid butane phase changes into a gaseous phase. The organic solutes having a boiling point higher than butane, 32° F./0° C., remain as a liquid or drop out as a solid in the expansion chamber. The gaseous butane is withdrawn from the expansion tank and compressed to liquid butane and returned to the multi purpose processing chamber. The flow of liquid butane through the Osorb® media is continued until it is deemed that the Osorb® media is regenerated. The liquid butane is recovered from both the multi purpose processing chamber and from the expansion chamber and placed into the liquid butane storage tank through a series of valves. The recovery of liquid and gaseous butane proceeds until a reduced pressure of −3 psi is reached. The multi purpose processing chamber containing the regenerated Osorb® media, essentially devoid of any absorbed organic solutes, is ready to treat additional water. Any trace gaseous butane remaining in the Osorb® media is easily displaced by influent water and is subsequently removed via a vapor-liquid separator. The organic solutes collected in the expansion chamber are withdrawn and collected in a separate container. The chemicals collected can be reutilized by various processes, e.g., distillation to separate cuts, used as a fuel blending component for various boilers or furnaces, etc.

Example 3

A regeneration system as shown in FIGS. 5 and 6 was employed at a site in Virginia to treat toluene contaminated water. Four totes (850 gallons total) with toluene contaminated water were treated with the system as illustrated in FIGS. 5 and 6. The initial toluene concentration was approximately 90 to 150 mg/L of the first three totes (700 gallons) and 500 mg/L for the fourth tote (150 gallons). The media vessels (e.g., 120, 120') were packed with Osorb® media from ABS Materials (7.8 kg of media per vessel). Both vessels were used to treat the water. While one vessel was used to treat the water, the media in the other vessel was regenerated. Propane was used as the displacement fluid to regenerate the media. The vessels were used in the treatment process as follows:

1. Treatment 1 (Vessel #2)—275 gallons from Tote 1 was passed through the vessel at 5 gallons per minute (GPM) for 55 minutes.
2. Treatment 2 (Vessel #1)—275 gallons from Totes 2 and 3 were passed through the vessel at 5 GPM for 55 minutes. Regeneration 1 (Vessel #2)—40 minute regeneration; idle for 15 minutes prior to next treatment.
3. Treatment 3 (Vessel #2)—275 gallons from Totes 3 and 4 were passed through the vessel at 5 GPM for 55 minutes. Regeneration 2 (Vessel #1)—40 minute regeneration; idle for 15 minutes prior to next treatment.

The pretreated water was pumped from Tote 1 through the second vessel (Vessel #2) at 5 GPM for 55 minutes. The treated water was discharged into an empty tote. Samples were collected in sets (influent and effluent) over time. After completing treatment of the water from Tote 1, the first vessel (Vessel #1) was used to treat water from Totes 2 and 3 using the same operating conditions as described above for Vessel #2 (5 GPM for 55 minutes). Vessel #2 was subjected to a regeneration process using propane as the displacement fluid. Propane was passed through the vessel for a period of 40 minutes. After completing the treatment of Totes 2 and 3 using Vessel #1, Vessel #2 was re-used to treat the water from Totes 3 and 4. The remaining water from Tote 3 was pumped through Vessel #2 at 5 GPM for 30 minutes and then water from Tote 4 was pumped through Vessel #2 at 5 GPM for 25 minutes. The collected influent and effluent samples were analyzed using headspace gas chromatography-mass spectrometry (GC-MS). Table 1 shows the results of the treatment:

TABLE 1

| Treatment | Treated Volume (Gallons) | Toluene Conc. (mg/L) Influent | Toluene Conc. (mg/L) Effluent | Toluene Removal Efficiency (%) | Reference |
| --- | --- | --- | --- | --- | --- |
| 1 | 50 | 89 | 1 | 99 | Tote 1 treated |
|   | 100 | 92 | 1 | 99 | with Vessel #2 |
|   | 200 | 87 | 1 | 99 |   |
| 2 | 50 | 150 | 3 | 98 | Totes 2 and 3 |
|   | 100 | 159 | 3 | 98 | treated with |
|   | 150 | 157 | 2 | 98 | Vessel #1 |
|   | 225 | 153 | 2 | 99 |   |
| 3 | 50 | 150 | 4 | 97 | Totes 3 and 4 |
|   | 100 | 148 | 4 | 97 | treated with |
|   | 125 | 513 | 4 | 99 | Vessel #2 |
|   | 175 | 515 | 4 | 99 |   |
|   | 210 | 507 | 4 | 99 |   |

The regeneration system effectively removed 97-99% of the toluene from the water sources. The removal efficiency was 97-99% for different initial toluene concentration loadings and had a high efficiency even when treating a source with high toluene concentrations (see, e.g., transition Treatment 3 transitioning from toluene concentrations of about 150 mg/L to concentrations over 500 mg/L). Further, the system showed high removal efficiencies using the regenerated media in accordance with the system and process.

Example 4

Saturated diesel water was treated using the regeneration system of FIGS. 5 and 6. The filter media employed was Osorb® media from ABS Materials. For the removal process, saturated diesel water was passed through the respective media vessels at a rate of 5 GPM for 60 minutes. In the regeneration step, propane was passed through the system for 30 minutes. After a vessel is used for treating the water, the flow of water is shut off to that vessel and the other vessel is used for treating water while the first vessel is regenerated. Samples were collected in sets (influent and effluent) over time. Table 2 shows the results from the treatment of the saturated diesel water.

TABLE 2

| Treatment | Average Diesel Conc. (ppm) | | Removal Efficiency (%) |
| --- | --- | --- | --- |
| | Influent | Effluent | |
| Filter 1 - initial use | 1440 | 10 | 99 |
| Filter 1 - Post regeneration | 166 | <1 | >99 |
| Filter 2 - initial use | 2029 | 14 | 99 |
| Filter 2 - post regeneration | 552 | 5 | 99 |

The system exhibited high removal efficiency for dispersed diesel. The oil and gas grease discharge limit is currently 35 mg/L for beneficial agricultural and wildlife reuse (see Fact Sheet Discharge. (n.d.) https://www.netl.doc.gov/research/coal/crosscutting/pwmis/tech-desc/discharge National Energy Technology Laboratory, U.S. Dept of Energy). The system was suitable for removing diesel well in excess of the discharge limit of diesel in water including from those regenerated filters.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various non-limiting embodiments of a system and method for removing organic solutes from water. Modifications may occur to those skilled in the art and to those who may make and use the invention. The disclosed embodiments are merely for illustrative purposes and not intended to limit the scope of the invention or the subject matter set forth in the claims.

What is claimed is:

1. A method for an extraction of an organic solute from an aqueous solution comprising:
   (i) treating an aqueous solution containing one or more organic solutes by passing the aqueous solution through a filter media vessel comprising a filter media selected from a sol-gel organosilicon media to remove at least one of the one or more organic solutes from the aqueous solution and providing a treated water supply;
   (ii) regenerating the filter media after the filter media becomes saturated or partially saturated with the one or more organic solutes by (a) removing air and/or oxygen from the filter media, and (b) supplying a displacement fluid to the saturated filter media to remove the at least one of the one or more organic solutes from the filter media and provide a waste displacement fluid comprising the displacement fluid and the at least one of the one or more organic solutes; and
   (iii) repeating steps (i) and (ii) one or more times to continue to treat the aqueous solution.

2. The method of claim 1 comprising treating the waste displacement fluid to separate the displacement fluid from the at least one of the one or more organic solutes.

3. The method of claim 2, wherein the displacement fluid is a liquid and treating the waste displacement fluid comprises subjecting the waste displacement fluid to conditions that vaporize the displacement fluid to provide a regenerated displacement fluid, but are such that the at least one of the one or more organic solutes remain in a liquid or solid state.

4. The method of claim 2, wherein the displacement fluid is a gas and treating the waste displacement fluid comprises subjecting the waste displacement fluid to conditions that compress extracted organic solutes to a liquid or solid state to provide a regenerated displacement fluid and a solution comprising the extracted organic solutes.

5. The method of claim 3, wherein the regenerated displacement fluid is converted to a liquid and recycled to the regenerating step.

6. The method of claim 3, wherein the regenerated displacement fluid is collected and employed in a subsequent regeneration step.

7. The method of claim 1, wherein regenerating the filter media by supplying the displacement fluid to the saturated filter media comprises (a) supplying a first displacement fluid to remove a first set of the one or more organic solutes from the filter media; and (b) supplying a second displacement fluid to remove a second set of the one or more organic solutes from the filter media.

8. The method of claim 7, wherein supplying the first displacement fluid and supplying the second displacement fluid are performed in separate, successive steps.

9. The method of claim 7 comprising purging the filter media following the treatment with the first displacement fluid and prior to the treatment with the second displacement fluid.

10. The method of claim 1 comprising:
   (ia) upon the filter media becoming saturated or partially saturated after step (i):
      (a) stopping a flow of a water supply containing the one or more organic solutes to the filter media and switching the flow of the water supply containing the one or more organic solutes to a second filter media for extracting the one or more organic solutes from the water supply; and
      (b) regenerating the filter media by supplying a gaseous or liquid displacement fluid to the filter media to extract the one or more organic solutes from the filter media;
   (ib) treating the water supply containing the one or more organic solutes with the second filter media until the second filter media becomes saturated or partially saturated;
   (iib) upon the second filter media becoming saturated or partially saturated:
      (a) stopping the flow of the water supply containing the one or more organic solutes to the second filter media and switching the flow of the water supply containing the one or more organic solutes back to the filter media to extract the one or more organic solutes from the water supply; and
      (b) regenerating the second media filter by supplying the gaseous or liquid displacement fluid to the second filter media to extract the one or more organic solutes from the second filter media.

11. The method of claim 10 comprising repeating steps (ia), (ib), and (iib).

12. The method of claim 1 wherein removing the air and/or oxygen from the filter media comprises treating the filter media with an inert gas.

13. The method of claim 1, wherein removing the air and/or oxygen from the filter media comprises subjecting the filter media to a vacuum.

14. The method of claim 1, wherein removing the air and/or oxygen from the filter media comprises (a-i) treating the filter media with an inert gas, and (a-ii) subjecting the filter media to a vacuum.

\* \* \* \* \*